(12) United States Patent
Walls et al.

(10) Patent No.: US 7,373,408 B2
(45) Date of Patent: May 13, 2008

(54) NETWORK COMMUNICATION APPARATUS AND METHOD

(75) Inventors: Jeffrey Joel Walls, Fort Collins, CO (US); Michael T Hamilton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 10/361,737

(22) Filed: Feb. 8, 2003

(65) Prior Publication Data

US 2004/0156378 A1 Aug. 12, 2004

(51) Int. Cl.
*G06F 15/16* (2006.01)
(52) U.S. Cl. .................... 709/227; 370/395.52
(58) Field of Classification Search ............... None
See application file for complete search history.

(56) References Cited

U.S. PATENT DOCUMENTS

| | | | |
|---|---|---|---|
| 4,475,192 A | | 10/1984 | Fernow et al. |
| 4,933,932 A | | 6/1990 | Quinquis et al. |
| 5,016,248 A | | 5/1991 | Kudoh |
| 5,291,482 A | | 3/1994 | McHarg et al. |
| 5,303,302 A | * | 4/1994 | Burrows ............ 713/161 |
| 5,610,914 A | | 3/1997 | Yamada |
| 5,701,427 A | | 12/1997 | Lathrop |
| 5,732,214 A | * | 3/1998 | Subrahmanyam ...... 709/227 |
| 5,802,058 A | | 9/1998 | Harris et al. |
| 6,128,295 A | | 10/2000 | Larsson et al. |
| 6,212,165 B1 | | 4/2001 | Mann et al. |
| 6,243,751 B1 | * | 6/2001 | Chatterjee et al. ...... 709/226 |
| 6,266,701 B1 | | 7/2001 | Sridhar et al. |
| 6,362,836 B1 | * | 3/2002 | Shaw et al. .............. 715/744 |
| 6,400,695 B1 | | 6/2002 | Chuah et al. |
| 6,445,717 B1 | | 9/2002 | Gibson et al. |
| 6,539,431 B1 | | 3/2003 | Sitaraman et al. |

(Continued)

OTHER PUBLICATIONS

Adamson, et al., NACK-Oriented Reliable Multicast (NORM) Protocol Building Blocks, Proceedings of the Forty-Ninth Internet Engineering Task Force (Jul. 2000) < http://www.ietf.org/proceedings/00dec/I-D/draft-ietf-rmt-morm-bb-00.txt.

(Continued)

*Primary Examiner*—Huy D. Vu
*Assistant Examiner*—Phuongchau B Nguyen

(57) ABSTRACT

A network communication apparatus comprises an application, a plurality of communication sessions, a transport manager, and buffer logic. The application is configured to initiate a session request specifying a set of receiving units and a transport protocol. The transport manager is configured to allocate at least one of the communication sessions to the application in response to the session request. The transport manager is further configured to provide a session identifier that identifies the allocated session. The transport manager configures, based on the session request, the allocated session to communicate with the specified set of receiving units via the specified protocol. The buffer logic is configured to store data produced by the application into the shared memory accessible to each of the communication sessions and to associate the stored data with the session identifier. The allocated session is configured to retrieve the data based on the session identifier and to transmit the retrieved data through a network to the specified set of receiving units via the specified protocol.

9 Claims, 13 Drawing Sheets

U.S. PATENT DOCUMENTS

| | | | |
|---|---|---|---|
| 6,914,607 B2 * | 7/2005 | Walls et al. | 345/536 |
| 7,013,338 B1 * | 3/2006 | Nag et al. | 709/226 |
| 7,058,600 B1 * | 6/2006 | Combar et al. | 705/34 |
| 2004/0030806 A1 * | 2/2004 | Pandya | 709/250 |
| 2004/0040025 A1 * | 2/2004 | Lehtinen | 718/104 |
| 2004/0076162 A1 * | 4/2004 | Lee et al. | 370/395.52 |
| 2004/0085949 A1 * | 5/2004 | Partanen et al. | 370/352 |
| 2004/0156392 A1 * | 8/2004 | Walls et al. | 370/469 |

OTHER PUBLICATIONS

Adamson, et al., NACK-Oriented Reliable Multicast Protocol (NORM), Proceedings of the Fourty-Ninth Internet Engineering Task Force (Nov. 2000) < http://www.ietf.org/proceedings/00dec/I-D/draft-ietf-rmt-morm-00.txt.

Walls, et al., Apparatus and Method for Transmitting Data Through a Network, U.S. Appl. No. 10/361,214 filed Feb. 8, 2003.

Walls, et al., Apparatus and Method for Buffering Data, U.S. Appl. No. 10/361,739 filed Feb. 8, 2003.

* cited by examiner

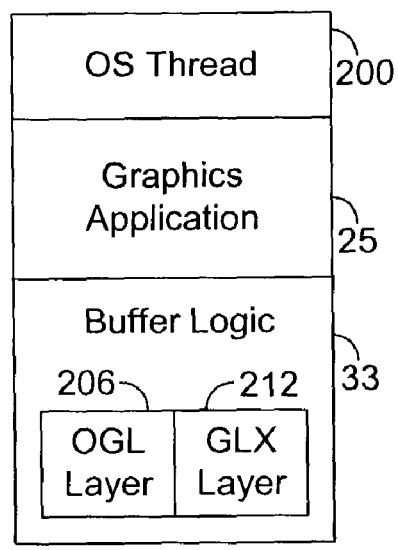
FIG. 8
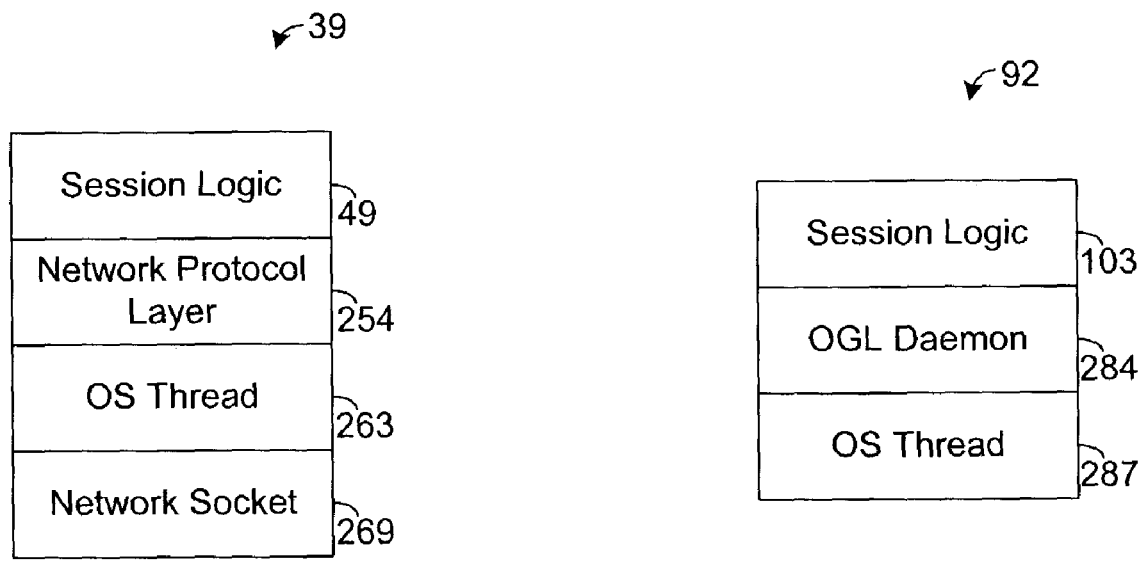
FIG. 9  FIG. 10

NETWORK COMMUNICATION APPARATUS AND METHOD

RELATED ART

In some graphics systems, graphical data is communicated through a network, such as a local area network (LAN) or wide area network (WAN), to remote locations where the graphical data is rendered. Unfortunately, transmission of the graphical data through a network can introduce significant delays thereby degrading or limiting the performance of the graphics system. Indeed, remote rendering for some graphics applications that produce large amounts of graphical data is not always feasible.

Further, in some graphics systems, graphical data may be communicated from a transmitting unit through a network to a large number of remote receiving units, which render the graphical data via known techniques. Unfortunately, the delays introduced by the network can be particularly problematic for such communication. In this regard, the transmitting unit may be configured to transmit each graphics command multiple times through the network (e.g., once for each destination receiving unit that is to receive the command). The multiple transmissions of the graphics commands can significantly increase the amount of data that is to be communicated through the network.

In such situations, performance of the system's graphics application, in particular, may be adversely affected. In this regard, the graphics application may spend a relatively large amount of processing time interfacing graphical data with the network. As a result, the graphics application may be unable to provide frame rates and image updates within acceptable performance margins.

SUMMARY OF THE INVENTION

Thus, better techniques for communicating data and, in particular, graphical data with a network are generally desirable. Generally, embodiments of the present invention provide an apparatus and method for communicating data with a network.

An exemplary network communication apparatus in accordance with one embodiment of the present invention comprises an application, a plurality of communication sessions, a transport manager, and buffer logic. The application is configured to initiate a session request specifying a set of receiving units and a transport protocol. The transport manager is configured to allocate at least one of the communication sessions to the application in response to the session request. The transport manager is further configured to provide a session identifier that identifies the allocated session. The transport manager configures, based on the session request, the allocated session to communicate with the specified set of receiving units via the specified protocol. The buffer logic is configured to store data produced by the application into the shared memory accessible to each of the communication sessions and to associate the stored data with the session identifier. The allocated session is configured to retrieve the data based on the session identifier and to transmit the retrieved data through a network to the specified set of receiving units via the specified protocol.

An exemplary network communication method in accordance with one embodiment of the present invention comprises initiating a session request, the session request specifying a set of receiving units and a transport protocol, the session request associated with an application, allocating at least one of a plurality of communication sessions to the application in response to the session request, providing, in response to the session request, a session identifier that identifies the allocated session, configuring the allocated session to communicate with the specified set of receiving units via the specified protocol, associating data produced by the application with the session identifier, locating, via the allocated session, the produced data based on the associated identifier, and transmitting, via the allocated session, to the specified set of receiving units via the specified protocol.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 8 is a block diagram illustrating an exemplary embodiment of a graphics application and its corresponding buffer logic, such as is depicted in FIG. 2.

FIG. 9 is a block diagram illustrating an exemplary communication session, such as is depicted in FIG. 2.

FIG. 10 is a block diagram illustrating an exemplary rendering session, such as is depicted in FIG. 2.

DETAILED DESCRIPTION

Figure 1:
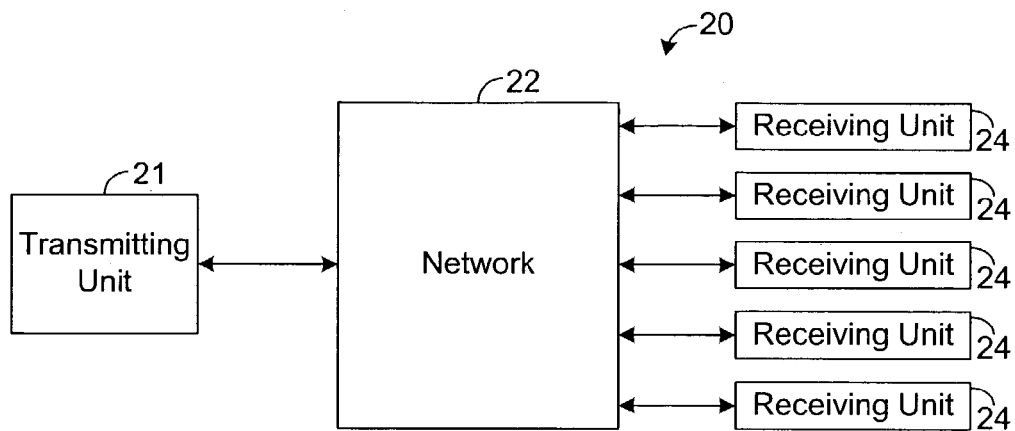
FIG. 1 is a block diagram illustrating a communication system that employs an exemplary transmitting apparatus or unit in accordance with the present invention.

FIG. 1 depicts a communication system 20 that comprises a transmitting apparatus or unit 21 in accordance with an exemplary embodiment of the present invention. The transmitting unit 21 of FIG. 1 transmits graphical data through a network 22 to at least one receiving unit 24. For illustrative purposes, the transmitting unit 21 will be described hereafter as transmitting graphical data to a plurality of receiving units 24, which render the graphical data via known or future-developed techniques. However, it should be noted that the transmitting unit 21 may be configured, in other embodiments, to communicate other types of data, and the transmitting unit 21 may be configured to transmit such data with any number of receiving units 24.

Figure 2:
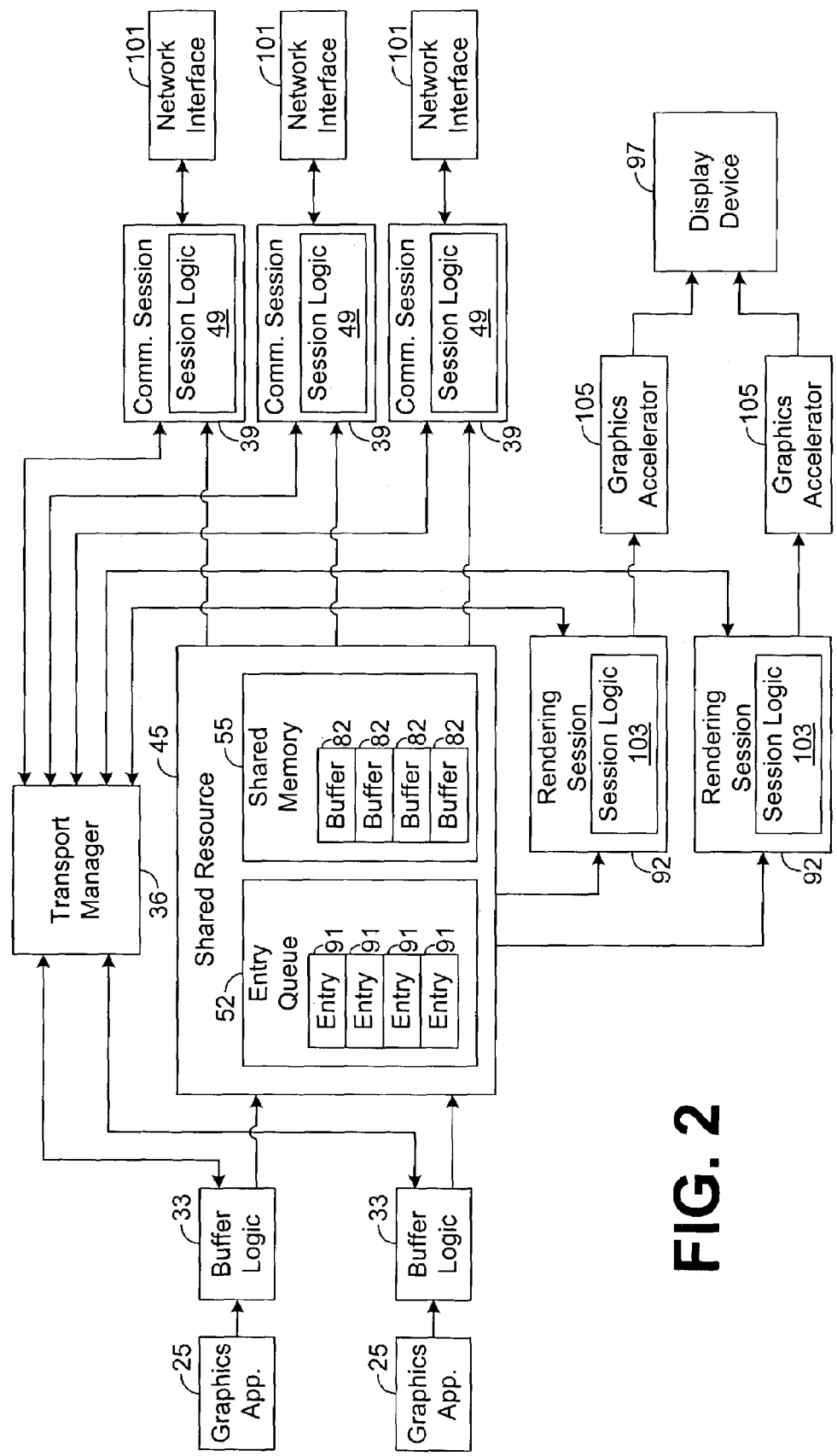
FIG. 2 is a block diagram illustrating an exemplary transmitting unit, such as is depicted in FIG. 1.

As shown by FIG. 2, the transmitting unit 21 preferably comprises at least one graphics application 25 that produces graphical data for transmission through the network 22. In the embodiment shown by FIG. 2, each graphics application 25 communicates with a corresponding set of buffer logic 33. When a graphics application 25 is invoked for communicating graphical data to at least one receiving unit 24, the graphics application 25 notifies its corresponding buffer logic 33, and this buffer logic 33 preferably submits a request, referred to hereafter as a "session request," to a transport manager 36. In response, the transport manager 36, as will be described in more detail hereinafter, associates the graphics application 25 with at least one of a plurality of processes 39, referred to herein as "communication sessions." As will be described in more detail below, each session 39 is responsible for interfacing, with the network 22, graphical data produced by its associated graphics applications 25.

In this regard, each graphics application 25 produces graphical data via known or future-developed techniques, and its corresponding buffer logic 33 stores the graphical data within a shared resource 45 that is accessible by each buffer logic 33, as well as each communication session 39 shown in FIG. 2. Session logic 49 within each communication session 39 searches the shared resource 45 for data that its communication session 39 is responsible for interfacing with the network 22. When the session logic 49 within a particular communication session 39 finds, in the shared resource 45, graphical data from a graphics application 25 associated with the particular communication session 39, the session logic 49 retrieves such graphical data from the shared resource 45. The particular communication session 39 then interfaces the retrieved graphical data with the network 22 such that the data is communicated to the appropriate receiving units 24.

Since communication of the graphical data with the network 22 is handled by associated communication sessions 39, a graphics application 25 and/or its corresponding set of buffer logic 33 may begin performing other tasks once the graphical data has been written to the shared resource 45. In this regard, it may be assumed, by the graphics application 25 and/or its corresponding set of buffer logic 33, that the graphical data will be successfully transmitted to the appropriate receiving units 24 once the graphical data has been stored in the shared resource 45. Thus, after the graphical data has, in fact, been stored in the shared resource 45, the graphics application 25 may begin to immediately process the next set of graphical data. As a result, delays introduced by the communication of graphical data through the network 22 preferably do not significantly impact the performance of the graphics application 25.

Furthermore, each communication session 39 preferably runs on a separate thread of execution as compared to the graphics application 25 and the other communication sessions 39. As a result, the consumption of processing resources by each communication session 39 preferably does not significantly reduce the processing speed of the graphics application 25 and to the other communication sessions 39. However, it should be noted that, in other embodiments, it is possible for multiple ones of the communication sessions 39 to be implemented on the same thread of execution as another communication session 39 or as a graphics application 25.

It should be further noted that there are various techniques and protocols that may be employed to buffer data in the shared resource 45. Exemplary techniques for achieving this functionality will now be described in more detail below.

When a graphics application 25 is ready to initiate communication with at least one receiving unit 24, this graphics application 25, referred to hereafter as the "transmitting application 25," notifies its corresponding set of buffer logic 33, referred to hereafter as the "transmitting buffer logic 33." In response to such notification, the transmitting buffer logic 33 is configured to submit a session request to the transport manager 36. This session request may identify (e.g., include the address of) each receiving unit 24 to which graphical data from the transmitting graphics application 25 is to be communicated, and the session request also may identify the type of transport protocol that is to be used to communicate such graphical data.

In a preferred embodiment, the network 22 is an internet protocol (IP) network, and the session request comprises the IP address of each receiving unit 24 that is to receive graphical data from the transmitting application 25. Further, the communication sessions 39 may be configured to enable various types of protocols for communication across the network 22. As an example, the communication sessions 39 may selectively enable communication via transmission control protocol (TCP), user datagram protocol (UDP), UDP-multicast (UDPM), and/or any other type of known or future-developed protocol.

In response to the session request, the transport manager 36 selects a set of communication sessions 39 to service the transmitting graphics application 25 (i.e., to handle the communication of the transmitting graphics application's data with the network 22). In this regard, the transport manager 36 preferably analyzes each active communication session 39 to determine whether any of the active sessions 39 are currently communicating data to the same set of receiving units 24 via the same protocol identified by the session request. Note that a communication session 39 is "active" when it is currently handling the communication of at least one graphics application 25, and a communication session 39 is "inactive" when it is not presently handling the communication of any of the graphics applications 25. Further note that while in an inactive state, a communication session 39 is preferably not running (e.g., is asleep) and, therefore, does not significantly consume processing resources.

Moreover, if the transport manager 36 identifies any communication sessions 39 that are communicating to the same set of receiving units 24 via the same protocol identified by the session request, the transport manager 36 may be configured to select such identified communication sessions 39, if any, to service the transmitting graphics application 25. Note that such communication sessions 39 may exist when another graphics application 25 has previously initiated communication, via the same protocol requested via the session request, with the same set of receiving units 24 identified by the session request.

If none or an insufficient number of the active communication sessions 39 are presently communicating with the same set of receiving units 24 and with the same transport protocol, then the transport manager 36 preferably also selects at least one of the inactive communication sessions 39 to service the graphics application 25. For each selected inactive session 39, the transport manager 36 activates (e.g., awakens) the selected session 39 and configures the session 39 to communicate, via the transport protocol identified by the session request, with the set of receiving units 24 also identified by the session request.

In this regard, the transport manager 36 preferably stores or maintains sufficient information for enabling the manager 36 to find and initiate communication with each of the receiving units 24. Moreover, when the transport manager 36 receives a session request from the transmitting buffer logic 33, the manager 36 establishes a network socket (not specifically shown in FIG. 2) configured to interface data with the network 22 via the transport protocol identified by the session request. Using this socket, the transport manager 36 establishes communication with each receiving unit identified by the session request. Once such communication is established, the transport manager 36 hands-off or, in other words, allocates the foregoing socket to at least one session 39 activated for servicing the requesting application 25. The activated session 39 may then utilize such socket for communicating with the identified receiving units 24 according to techniques that will be described in more detail hereinbelow.

Note that the number of sessions 39 selected to service a particular application 25 may vary depending on various factors and/or the configuration of the system 20. For example, the graphics application 25 or the buffer logic 33 that initiated the session request may be configured to request that a particular number of sessions 39 be utilized for communicating the graphical data produced by the graphics application 25. The transport manager 36 may then be configured to select such a number of sessions 39 for servicing the graphics application 25 to the extent that such a number of sessions 39 is available.

In an alternative embodiment, the transport manager 36 maybe configured to determine the number of communication sessions 39 to be used for servicing a particular application 25. For example, the transport manager 36 may be configured to allocate or select approximately the same number of sessions 39 for each application 25. In another embodiment, the transport manager 36 may prioritize the applications 25 according to any known or future-developed algorithm and then allocate a larger number of sessions 39 to service the applications 25 assigned higher priorities. Further, if a desired number of sessions 39 are not available for servicing a particular application 25, the transport manager 36 may be configured to reallocate at least one of the active sessions 39 such that the reallocated sessions 39 service (i.e., communicate the graphical data produced by) the particular application 25. Techniques for allocating and reallocating the sessions 39 will be described in more detail hereinbelow.

The transport manager 36 preferably assigns, to each set of communication sessions 39 configured to transmit to the same receiving units 24 via the same protocol, an identifier that uniquely identifies such sessions 39 from the other sessions 39 that also may retrieve data from the shared resource 45. The transport manager 36, after selecting a set of the communication sessions 39 for servicing the transmitting graphics application 25, as described above, provides the session identifier of the selected set to the transmitting buffer logic 33. As will be described in more detail hereinbelow, the transmitting buffer logic 33 then uses this session identifier when storing, to the shared resource 45, graphical data that is to be communicated to the receiving units 24.

Figure 3:
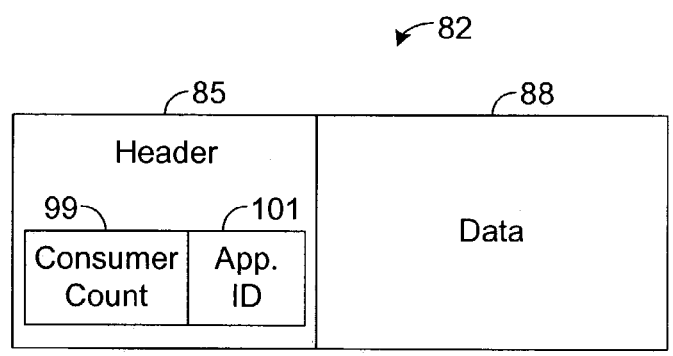
FIG. 3 is a block diagram illustrating an exemplary buffer within a shared resource, such as is depicted in FIG. 2.

As shown by FIG. 2, the shared resource 45 preferably comprises an entry queue 52 and shared memory 55 accessible by each of the sets of buffer logic 33 and the communication sessions 39. The shared memory 55 is preferably partitioned into multiple segments or blocks 82, referred to as "buffers." As shown by FIG. 3, each buffer 82 comprises a header 85, where various control information may be stored, and a data portion 88, where data (e.g., graphical data from one of the graphics applications 25) to be communicated over the network 22 may be stored. Techniques for storing and retrieving data to and from the buffers 82 will be described in more detail hereinbelow.

Figure 4:
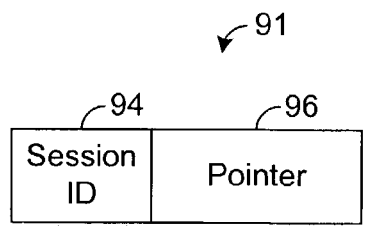
FIG. 4 is a block diagram illustrating an exemplary entry in an entry queue of a shared resource, such as is depicted in FIG. 2.

The entry queue 52 of FIG. 2 preferably stores a plurality of queued entries 91, and each entry 91 has a session identifier (ID) 94 and a pointer 96, as shown by FIG. 4. Initially, the number of entries 91 corresponds to the number of buffers 82. More specifically, in the exemplary embodiment shown by FIG. 2, there is initially one entry 91 for each buffer 82. Further, each entry 91 preferably corresponds to a different buffer 82, and the pointer 96 of an entry 91 corresponding to a particular buffer 82 preferably points to (i.e., identifies) the particular buffer 82. Thus, initially, each entry 91 corresponds to and points to a different buffer 82.

Initially, the session identifier 94 of each entry 91 comprises a value, referred to hereafter as an "empty buffer value," which indicates that the buffer 82 identified by the entry's pointer 96 is empty (i.e., may be written to without corrupting or losing data). Note that once operation of the system 20 is begun, new entries 91 having other values stored as the session identifier 94 are preferably pushed into the queue 52 as will be described in more detail hereafter. Thus, after operation of the system 20 is initiated, some of the entries 91 may have the empty buffer value stored as their session identifiers 94, and some of the entries 91 may other values stored as their session identifiers 94.

Moreover, when the transmitting application 25 is ready to transmit a set of graphical data to a set of receiving units 24, its corresponding set of buffer logic 33 (i.e., the transmitting buffer logic 33) searches the queue 52 for an entry 91 having the empty buffer value stored as the entry's session identifier 94. Such an entry 91 is referred to herein as an "empty buffer entry 91." When the transmitting buffer logic 33 locates such an empty buffer entry 91, it pulls the entry 91 from the queue 52 or, in other words, "pops" the entry 91 such that the entry 91 is no longer stored in the queue 52, thereby disabling other components of the transmitting unit 21 from accessing the popped entry 91. The transmitting buffer logic 33 then writes the aforementioned set of graphical data to the buffer 82 pointed to or, in other words, identified by the pointer 96 of the popped entry 91. For illustrative purposes, the foregoing buffer 82 will be referred to hereafter as the "used buffer 82."

After popping, from the queue 52, an empty buffer entry 91 identifying the used buffer 82 and then writing to the used buffer 82, the transmitting buffer logic 33 pushes, into the queue 52, an entry 91 having the same pointer 96 as the popped entry 91 (i.e., having a pointer 96 identifying the used buffer 82). However, the transmitting buffer logic 33 assigns the session identifier 94 of the pushed entry 91 the value of the session identifier previously provided to it by the transport manager 36. In other words, the session identifier 94 of the pushed entry 91 is associated with or identifies the set of communication sessions 39 that have been selected, by the transport manager 36, to service the transmitting application 25.

Note that, in one exemplary embodiment, each set of buffer logic 33 is configured to write data to a buffer 82 only when the set of buffer logic 33 is able to locate, in the queue 52, an empty buffer entry 91 that points to the particular buffer 82, as described above. Thus, by popping, from the queue 52, an empty buffer entry 91 identifying the used buffer 82, the transmitting buffer logic 33 temporarily prevents or disables other sets of buffer logic 33 from writing to the used buffer 82, thereby preventing corruption of the graphical data written to the used buffer 82 by the transmitting buffer logic 33.

When a set of buffer logic 33 pushes an entry 91 into the queue 52, the set of buffer logic 33 preferably increments a value, referred to herein as the "consumer count 99" (FIG. 3), in the header 85 of the buffer 82 identified by the pushed entry 91. Thus, in the example described above where the transmitting buffer logic 33 pushes, into the queue 52, an entry 91 pointing to the used buffer 82, the transmitting buffer logic 33 increments the consumer count 99 in the header 85 of the used buffer 82. Initially, the consumer count 99 in each of the headers 85 is set to a value of zero (0). Thus, if the transmitting buffer logic 33 is the first set of buffer logic 33 to write to the used buffer 82 after initialization, the transmitting buffer logic 33 increments the consumer count 99 in the header 85 of the used buffer 82 to a value of one (1). As will become apparent in the following description of the system 20, the consumer count 99 in the header 85 of a buffer 82 generally indicates the number of entries 91 (excluding empty buffer entries) in the queue 52 that point to the buffer 82.

In addition to incrementing the consumer count 99 of a buffer 82 after writing graphical data to the buffer 82, buffer logic 33 also stores, in the header 85, a value uniquely identifying the graphics application 25 that produced the data written to the buffer 55. This value will be referred to herein as the "application identifier 146." Thus, by analyzing the application identifier 146 in the header 85 of a buffer 82, it is possible to determine which application 25 produced the data that is stored in the data portion 88 of the buffer 82. Utilization of the application identifier 146 will be described in more detail hereafter. Note that the application identifier 146 of each application 25 may be predefined and provided by the graphics applications 25, or the transport manager 36 may be configured to assign a unique application identifier to each application 25 that initiates a session request transmitted to the transport manager 36.

The session logic 49 of each active communication session 39 preferably searches the queue 52 for any entries 91 that have session identifiers 94 identifying its communication session 39. When such an entry 91 is found, the session logic 49 pulls the entry 91 from the queue 52 or, in other words, "pops" the entry 91 such that the entry 91 is no longer stored in the queue 52 thereby disabling other components of the transmitting unit 21 from accessing the popped entry 91. The session logic 49 then retrieves the graphical data stored in the buffer 82 identified by the popped entry's pointer 96 (FIG. 4) and provides the retrieved data to a network interface 101, which transmits the retrieved data to the network 22 (FIG. 1). As described above, when a session 39 is activated, it is instructed by the transport manager 36 to communicate, via a certain protocol, over the network 22 to a set of identified receiving units 24. Moreover, when the session 39 pops an entry 91 from the queue 52 and retrieves the graphical data stored at the buffer 82 identified by the popped entry 91, the session 39 transmits, according to the certain protocol, the retrieved data over the network 22 to the identified receiving units 24.

As an example, assume that the aforementioned session request submitted by the transmitting buffer logic 33 to the transport manager 36 requested a set of sessions 39 that communicate via TCP to a particular set of receiving units 24. In such an example, the sessions 39 selected by the transport manager 36 to service the transmitting application 25 are configured to transmit any graphical data retrieved from the buffers 82 by such sessions 39 to the particular set of receiving units 24 according to TCP. Thus, when any of such sessions 39 pops an entry 91 pointing to the buffer 82 storing graphical data produced by the transmitting application 25, the session 39 retrieves and packetizes this graphical data. Then, using the addresses provided to the session 39 by the transport manager 36 (e.g., the addresses in the aforementioned session request), the session 39 transmits the packetized graphical data to each of the receiving units 24 within the particular set of receiving units 24. The session 39 preferably includes, in each packet, the application identifier 146 in the header 85 of the buffer 82 from which the graphical data is retrieved. Thus, for each packet of data transmitted through network 22, devices or systems at the receiving unit 24 may determine which application 25 produced the received data. Co-pending and commonly-assigned U.S. patent application entitled "Apparatus and Method for Communicating with a Network," and filed on Feb. 8, 2003, which is incorporated herein by reference, describes exemplary techniques for transmitting data from the transmitting unit 21 and receiving data at the receiving units 24.

It should be noted, that when the transport manager 36 selects more than one session 39 to service the transmitting graphics application 25, there are a plurality of sessions 39 searching the queue 52 for entries 91 that point to buffers 82 storing graphical data from the transmitting application 25. In particular, each of the sessions 39 selected, by the transport manager 36, to service the transmitting application 25 searches the queue 52 for entries 91 having the session identifier 94 associated with the selected set of sessions 39. However, since each session 39 pops an entry 91 from the queue 52 when it locates an entry 91 having the associated session identifier 94, the other selected sessions 39 that are searching for the same session identifier 94 are prevented or disabled from finding the popped entry 91. Thus, only the session 39 that pops the entry 91 from the queue 52 accesses and transmits, across the network 22, the data stored in the buffer 82 pointed to by the popped entry 91. Therefore, multiple transmissions of the same graphical data by multiple sessions 39 is prevented even though multiple sessions 39 may be allocated for servicing the same application 25 and, therefore, assigned the same session identifier. Such a feature helps to reduce needless additional transmissions of the same graphical data thereby helping to enhance the efficiency of the system 20.

It should be further noted that it may desirable for the graphical data produced by the transmitting application 25 to be displayed locally. Thus, as shown by FIG. 2, the system 20 comprises at least one rendering session 92 that is configured to locally render graphical data from the shared memory 55. In this regard, each rendering session 92, like the communication sessions 39, is preferably associated with a session identifier that identifies the rendering session 92. If the graphical data written to the used buffer 82 is to be rendered locally in addition to being transmitted over the network 22, the transmitting buffer logic 33 is configured to push, into the queue 52, an additional entry 91 for each rendering session 92 that is to separately retrieve and render the graphical data in the used buffer 82. Each such additional entry 91 preferably has a pointer 96 (FIG. 4) identifying the used buffer 82 and has a session identifier 94 identifying the rendering session 92 that is to retrieve and render the graphical data in the used buffer 82. The transmitting buffer logic 33, upon pushing each such additional entry 91 into the queue 52, also increments the consumer count 99 in the header 85 of the used buffer 82. Thus, the queue 52 may simultaneously have multiple entries 91 with pointers 96 pointing to the used buffer 82.

Each rendering session 92, like the communication sessions 39, has session logic 103 that is configured to search the queue 52 for entries 91 having a session identifier 94 that identifies the logic's rendering session 92. When this session logic 103 locates such an entry 91, the session logic 103 pops the entry 91 from the queue 52 and retrieves the graphical data stored in the data portion 88 of the buffer 82 pointed to by the pointer 96 of the popped entry 91. The rendering session 92 then renders this retrieved data via a graphics accelerator 105 to a local display device 97 (FIG. 2), which displays the rendered data.

As an example, assume that it is desirable for each of two rendering sessions 92 to separately render each set of graphical data produced from the transmitting application 25. When handling the session request initiated by the transmitting application 25, the transport manager 36 preferably assigns each of the two rendering sessions 92 different session identifiers 94. The transport manager 36' may then provide each of these session identifiers 94 to the transmitting buffer logic 33. In such an example, the transmitting buffer logic 33, in addition to pushing an entry 91 pointing to the used buffer 82 and identifying the selected communication sessions 39, also pushes two additional entries 91 to the queue 52. Each such additional entry 91 points to the used buffer 82 and has a session identifier 94 identifying a different one of the two rendering sessions 92. Thus, each rendering session 92, upon locating the additional entry 91 that identifies it, pops this additional entry 91 from the queue 52 and then reads the used buffer 82 that is pointed to by the additional entry 91. The rendering session 92 then renders this retrieved data. As a result, both rendering sessions 92 retrieve and render the graphical data stored in the used buffer 82.

In another example, it may be desirable for only one of the two rendering sessions 92 to render the graphical data stored in the used buffer 82. In such an example, the transport manager 36 may assign both rendering sessions 92 the same session identifier 94. In such an example, the one session identifier 94 is provided to the transmitting buffer logic 33, and the transmitting buffer logic 33 pushes only one additional entry 91 to the queue 52 in addition to the afore-described entry 91 that identifies the selected communication sessions 39. The additional entry 91 comprises the session identifier 94 provided by the transport manager 36, and the first of the two rendering sessions 92 to find the additional entry 91 pops the entry 91 from the queue 52 in response to a determination that the additional entry 91 identifies it. This rendering session 92 then retrieves and renders the graphical data stored in the used buffer 82.

By popping the additional entry 91, the foregoing rendering session 92 prevents or disables the other rendering session 91 from finding the additional entry 91, thereby preventing the other rendering session 91 from rendering the same graphical data. In such an example, each rendering session 91 renders a portion of the graphical data produced by the transmitting application 25. Rendering of graphical data by multiple rendering sessions 92 in this manner helps to decrease the amount of graphical data that each rendering session 92 would otherwise render if both rendering sessions 92 were not allocated to the same graphics application 25.

Note that a graphics application 25 or its corresponding set of buffer logic 33 may request the number of rendering sessions 92 that are allocated for locally rendering its graphical data. Provided that the requested number of rendering sessions 92 are available, the transport manager 36 may allocate the rendering sessions 92 as requested. However, the transport manager 36 may also be configured to dynamically allocate and reallocate the rendering sessions 92 based on run-time conditions, such as, for example, the number of applications 25 requesting local rendering, the amount of graphical data produced by such applications 25, etc. To reallocate a rendering session 92 to a different application 25, the transport manager 36 may simply assign the rendering session 92 a new session identifier 94 and then provide this new session identifier 94 to the different application 25. Upon being assigned a new session identifier 94, the rendering session 92 stops searching for its previous session identifier 94 and begins searching the queue 52 for its new session identifier 94. Thus, the rendering session 92 stops rendering data from the application 25 previously serviced by it and begins rendering data from the different application 25.

After a session 39 or 92 retrieves graphical data from a buffer 82 as described above, the session 39 or 92 preferably decrements the consumer count 99 (FIG. 3) stored in the buffer's header 85. If the consumer count 99 is decremented to zero by the session 39 or 92, then there are preferably no entries 91 in the queue 52 that identify the buffer 82. In this regard, all such entries 91 previously pushed to queue 52 have been popped from the queue 52 according to the techniques described above. Thus, the data portion 88 may be overwritten since each session 39 or 92 that is to process the graphical data stored in data portion 88 has already retrieved such data from the shared memory 55. Therefore, when a session 39 or 92 decrements the consumer count 99 to zero, the session 39 or 92 preferably pushes, into the queue 52, an empty buffer entry 91 having a pointer 96 that points to the foregoing buffer 82. Such an action has the effect of freeing the buffer 82 such that any of the sets of buffer logic 33 may write into the buffer 82 once such logic 33 has located and popped the foregoing empty buffer entry 91.

However, if the consumer count 99 in the header 82 is greater than zero after being decremented by a session 39 or 92, then there is at least one other entry 91 that points to the buffer 82 and identifies another session 39 or 92. Thus, there is another session 39 or 92 that is to use the graphical data in the data portion 88 of the buffer 82 once the other session 39 or 92 locates and pops the other entry 91. To prevent such data from being overwritten until the other session 39 or 92 is able to retrieve the data, the session 39 or 92 that decremented the consumer count 99 preferably skips the step of pushing, into the queue 52, an empty buffer entry 91 that points to the buffer 82 containing the decremented consumer count 99. As a result, until the other session 39 or 92 retrieves the graphical data stored in the buffer and then pushes such an empty buffer entry 91 into the queue 52, none of the sets of buffer logic 33 will write into the buffer 82.

Figure 5:
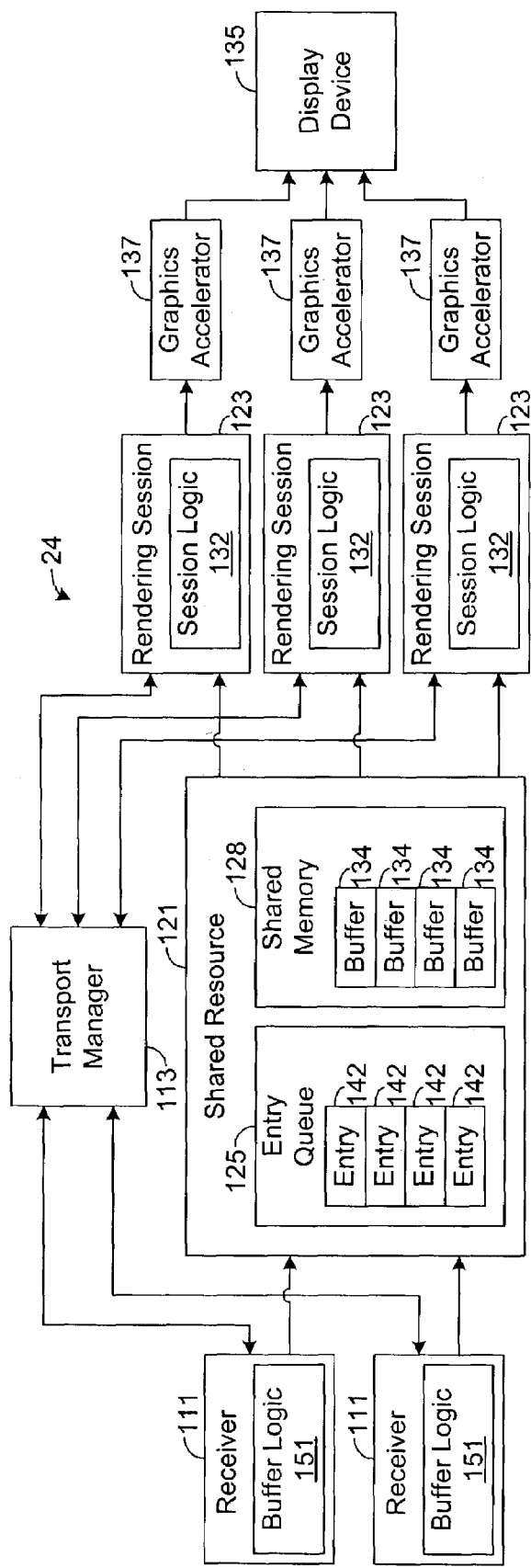
FIG. 5 is a block diagram illustrating an exemplary receiving unit, such as is depicted in FIG. 1.

It should be noted that, at each receiving unit 24, similar techniques for buffering the graphical data received from the network 22 may be employed. In this regard, as shown by FIG. 5, each receiving unit 24 preferably comprises at least one receiver 111, a transport manager 113, a shared resource 121, and at least one rendering session 123 similar in configuration and operation as the rendering sessions 92 of FIG. 2. The shared resource 121 is preferably accessible by each receiver 111 and each rendering session 123. Further, similar to the shared resource 45 described above, the shared resource 121 at the receiving unit 24 preferably comprises an entry queue 125 and shared memory 128, and the shared memory 128 is preferably partitioned into multiple buffers 134.

When contacted by the transport manager 36 (FIG. 2) of the transmitting unit 21, the transport manager 113 of FIG. 5 is configured to establish a network socket (not specifically shown in FIG. 5) for communicating with the network socket that is handed-off by the transport manager 36 to one of the communication sessions 39. Similarly, the transport manager 113 hands-off the established network socket to at least one of the receivers 111 to enable such receiver 111 to communicate with the foregoing communication session 39 via the sockets established by the transport managers 36 and 113. Techniques that may be employed by the transport managers 36 and 113 to establish network sockets will be described in more detail hereinbelow.

Figure 6:
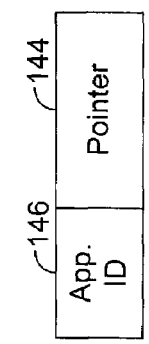
FIG. 6 is a block diagram illustrating an exemplary entry in an entry queue of a shared resource, such as is depicted in FIG. 5.

As shown by FIG. 5, the entry queue 125 preferably stores a plurality of queued entries 142, and each entry 142, as shown by FIG. 6, has a pointer 144 and an application identifier 146, which is received from the network 22. Like the pointers 96 of the queue entries 91 of FIG. 4 that identify buffers 82 (FIG. 2) in shared memory 55, the pointers 144 of the queue entries 142 point to or, in other words, identify buffers 134 in the shared memory 128. Initially, the number of entries 142 corresponds to the number of buffers 134. More specifically, there is initially one entry 142 for each buffer 134. Further, each entry 142 preferably corresponds to a different buffer 134, and the pointer 144 of the entry 142 corresponding to a particular buffer 134 preferably points to (i.e., identifies) the particular buffer 134. Thus, initially, each entry 142 corresponds to and points to a different buffer 134.

Like the session identifiers 94 of the entries 91 in FIG. 2, the application identifier 146 of each entry 142 initially comprises an empty buffer value indicating that the buffer 134 identified by the entry's pointer 144 is empty (i.e., may be written to without corrupting or losing data). Note that once operation of the system 20 is begun, new entries 142 having other values stored as the application identifier 146 are preferably pushed into the queue 125, as will be described in more detail hereafter. Thus, after operation of the system 20 is initiated, some of the entries 142 may have the empty buffer value stored as their application identifiers 146, and some of the entries 142 may other values stored as their application identifiers 146.

Moreover, when a receiver 111 receives graphical data from the network 111, buffer logic 151 within the receiver 111 searches the queue 125 for an entry 142 having the empty buffer value stored as the entry's application identifier 146. Such an entry 142 is referred to as an "empty buffer entry 142." When the foregoing logic 151, referred to hereafter as the "receiving buffer logic 151," locates such an empty buffer entry 142, the receiving buffer logic 151 pulls the empty buffer entry 142 from the queue 125 or, in other words, "pops" the entry 142 such that the empty buffer entry 142 is no longer stored in the queue 125. The receiving buffer logic 151, then writes the received graphical data to the buffer 134 pointed to or, in other words, identified by the pointer 144 of the popped entry 142. For illustrative purposes, the foregoing buffer 134 will be referred to hereafter as the "used buffer 134."

Figure 7:
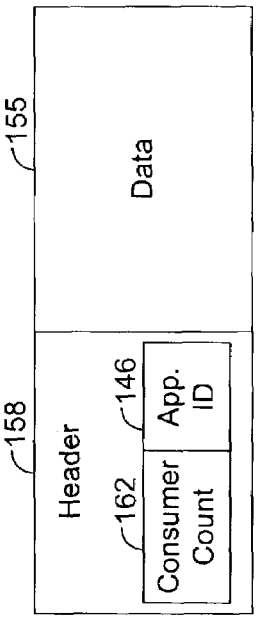
FIG. 7 is a block diagram illustrating an exemplary buffer within a shared resource, such as is depicted in FIG. 5.

As shown by FIG. 7, each buffer 134 comprises data portion 155 and a header 158. In general, graphical data is stored in the data portion 155, and various control information is stored in the header 158. As an example, the buffer logic 151 may write, into the header 158, the application identifier 146 identifying the application 25 that produced the data presently stored in the data portion 155. The header 158 also preferably comprises a consumer count 162 that generally indicates the number of rendering sessions 123 that are to read and utilize the data stored in the data portion 155. The consumer count 162 is preferably initialized to a value of zero (0) but may be incremented and decremented, as will be described in more detail below.

After popping, from the queue 125, the empty buffer entry 142 identifying the used buffer 134, the receiving buffer logic 151 pushes, into the queue 125, at least one entry 142 having the same pointer 144 as the popped entry 142 (i.e., having a pointer 144 identifying the used buffer 134). However, the receiving receiver 111 assigns the application identifier 146 of the pushed entry 142 the value of the application identifier transmitted along with the graphical data over the network 142. Thus, the application identifier 146 of the pushed entry 142 identifies the graphics application 25 that originally produced the graphical data being stored in the used buffer 134 by the receiving buffer logic 151. Note that the buffer logic 151 also sets the consumer count 162 of the foregoing buffer 134 to a value when writing to the buffer 134, and the number of the aforementioned entries 142 pushed to the queue 125 by the logic 151 preferably corresponds to the consumer count value, as will be described in more detail hereinbelow.

Note that each receiver 111 is preferably configured to write data to a particular buffer 134 only when the receiver 111 is able to locate an empty buffer entry 142 in the queue 125 that points to the particular buffer 134. Thus, by popping, from the queue 125, an empty buffer entry 134 identifying a buffer 134, a receiver 111 temporarily prevents or disables other receivers 111 from writing to the buffer 134, thereby preventing corruption of the graphical data written to the buffer 134.

Like the transport manager 36 of FIG. 2, the transport manager 113 of the receiving unit 24 depicted by FIG. 5 preferably allocates at least one rendering session 123 for rendering the graphical data from a particular application 25. This may be achieved by providing the application's identifier 146 to each rendering session 123 that is to render the application's graphical data. Session logic 132 of each such rendering session 123 then searches the entry queue 125 for entries 142 having the application identifier 146 provided to the session 123 much in the same manner that each rendering session 92 of FIG. 2 searches the queue 52 for entries 91 having the session identifier 94 provided to the session 92 by the transport manager 36. When the session logic 132 finds such an entry 142, the session logic 132 pops the entry 142 from the queue 125 and retrieves the graphical data stored in the buffer 134 pointed to by the popped entry 142. The session logic 132 then renders the retrieved data to at least one display device 135 via a graphics accelerator 137. Note that the application identifier of each application 25, if not already known by the transport manager 113, may be transmitted to the transport manager 113 by the transport manager 36 of FIG. 2 or some other component of the transmitting unit 21.

Like the transport manager 36 of FIG. 2, the transport manager 113 may allocate and reallocate different rendering sessions 132 to different graphics applications 25. To allocate a rendering session 132 to a particular application 25, the transport manager 113 may transmit, to the session 132, a command referred to herein as an "allocation command" that comprises the application identifier identifying the particular application 25. In response to such a command, the session logic 132 of the session 123 that receives the command may begin searching, in the queue 125, for the application identifier that is included in the command. To unallocate a session 132 from servicing a particular application 25, the transport manager 113 may transmit, to the session 132, a command referred to herein as an "unallocate command" that comprises the application identifier identifying the particular application 25. In response to such a command, the session logic 132 of the session 123 that receives the command may stop searching for the application identifier included in the command.

Furthermore, like the transport manager 36 of FIG. 2, the transport manager 113 of the receiving unit 24 depicted by FIG. 5 may control whether or not each set of graphical data produced by a particular graphics application 25 is rendered by each rendering session 123 allocated to the transmitting application 25. In this regard, the transport manager 113 preferably provides, to each receiver 111, the application identifier of each graphics application 25 that produces data received by the receiving unit 24. Along with this application identifier, the transport manager 113 also preferably provides a number, referred to hereafter as a "session count." If each rendering session 123 allocated to the application 25 identified by the associated application identifier is to render each set of graphical data produced by such application 25, then the transport manager 113 transmits, as the session count, a value indicative of the total number of rendering sessions 123 allocated to the foregoing graphics application 25. However, if each set of graphical data produced by the foregoing application 25 is to be rendered by only one of the allocated rendering sessions 123, then the transport manager 113 sets the session count to a value of one (1). Utilization of the session count provided to a receiver 111 will be described in more detail hereinbelow.

Moreover, when a receiver 111 receives a set of graphical data and stores the graphical data into a buffer 134, as described above, the buffer logic 151 of this receiver 111 preferably sets the value of the buffer's consumer count 162. In this regard, the buffer logic 151 analyzes the associated session count that was previously provided by the transport manager 113 along with the application identifier identifying the application 25 that produced the graphical data. The buffer logic 151 then increments the consumer count 162 of the buffer 134 by the number indicated by the associated session count. As noted above, the buffer logic 151 also pushes, to the queue 125, the same number of entries 142 that point to the foregoing buffer 132. Thus, the consumer count 162 indicates the number of times that the rendering sessions 123 will read the buffer 134 in response to the foregoing entries 142.

Like the rendering sessions 92 of FIG. 2, the session logic 132 of each rendering session 123, after reading a buffer 134, is configured to decrement the consumer count 162 of the read buffer 134. If the consumer count 134 is decremented to zero by the session logic 132 of a rendering session 123, then the data portion 155 may be overwritten. In this regard, each entry 142 identifying the buffer 134 has been pulled from the queue 125, and there are, therefore, no more rendering sessions 123 that are to read and utilize the data stored in the data portion 155. Thus, the session logic 132 that decremented the consumer count 162 to zero (0) preferably pushes, into the queue 125, an empty buffer entry 142 having a pointer 144 that points to the foregoing buffer 134. Such an action has the effect of freeing the buffer 134 such that any of the receivers 111 may write into the buffer 134, according to the aforedescribed techniques, once such a receiver 111 has located and popped the foregoing entry 142. Note that techniques other than those described above may be employed to buffer data at the receiving units 24. For example, U.S. patent application entitled "System and Method for Buffering Data Received from a Network," and filed on Feb. 8, 2003, which is incorporated herein by reference, describes additional techniques for buffering data at a receiving unit 24.

It should be noted that the graphics applications 25, the buffer logic 33, the transport manager 36, the communication sessions 39, the rendering sessions 92, the receivers 111, and the rendering sessions 123 may be implemented in hardware, software, or any combination thereof. In an exemplary embodiment, which will be described in more detail hereinbelow, the graphics applications 25, buffer logic 33, transport manager 36, the communication sessions 39, the rendering session 92, and the rendering sessions 123 are implemented in software, and the receivers 111 are implemented via a combination of the hardware and software.

When any portion of the aforementioned components is implemented in software, such portion can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Various types of network protocols may be employed to process and render the graphical data produced by the graphics applications 25. In the exemplary embodiment of the system 20 described herein, X Protocol is preferably utilized to render two-dimensional (2D) graphical data, and an extension of X Protocol, referred to as "OpenGL (OGL) Protocol," is preferably utilized to render three-dimensional (3D) graphical data, although other types of known or future-developed protocols may be utilized in other embodiments.

By way of background, OGL Protocol is a standard application programming interface (API) to hardware that accelerates 3D graphics operations. Although OGL Protocol is designed to be window-system independent, it is often used with window systems, such as the X Window System, for example. In order that OGL Protocol may be used in an X Window System environment, an extension of the X Window System has been developed called "GLX." For more complete information on the GLX extension to the X Window System and on how OGL Protocol can be integrated with the X Window System, see for example Mark J. Kilgard, OpenGL Programming for the X Window System (Addison-Wesley Developers Press 1996), which is incorporated herein by reference. Also see commonly-assigned U.S. Pat. No. 6,249,294, entitled "3D Graphics in a Single Logical Screen Display Using Multiple Remote Computer Systems," which is incorporated herein by reference as well.

As shown by FIG. 8, each graphics application 25 preferably runs on an operating system (OS) thread 200 along with its corresponding buffer logic 33, which preferably comprises an OGL layer 206 and a GLX layer 212. The graphics application 25 may be any known or future-developed application for producing or generating graphical data. The OGL and GLX layers 206 and 212, via known or future-developed techniques, preferably convert the graphical data from the graphics application 25 into a form that is compatible with OGL standards. Further, the OGL layer 206 preferably serves as an interface between the graphics application 25 and the transport manager 36. In this regard, the OGL layer 206 is preferably aware of which receiving units 24 are to receive the graphical data produced by the graphics application 25, and the OGL layer 206 submits a session request to the transport manager 36 when the graphics application 25 is ready to begin producing graphical data for transmission to the receiving units 24.

When the graphics application 25 actually begins producing graphical data for transmission to the receiving units 24, the OGL and GLX layers 206 and 212 convert the graphical data into a form compatible with OGL standards and store the converted graphical data in the shared resource 45 according to the techniques previously described above. Once a set of graphical data is stored in the shared resource 45, a set of communication sessions 39 selected by the transport manager 36 is responsible for interfacing such data with the network 22, and the graphics application 25, which is preferably running on a separate thread of execution, may begin processing other sets of graphical data. Thus, the graphics application 25 is not burdened with the task of interfacing the graphical data with the network 22, thereby helping the graphics application 25 to produce graphical data quicker than otherwise would be possible if the graphics application 25 is burdened with such a task.

As shown by FIG. 9, each communication session 39 preferably comprises session logic 49 and a network protocol layer 254 running on an OS thread 263 that is separate from the OS thread 200 of FIG. 8. The session logic 49 is configured to retrieve graphical data from the shared resource 45 in accordance with the techniques described hereinabove. In this regard, the session logic 49 searches the queue 52 for an entry 91 having a session identifier 94 that identifies the session 39 and retrieves the graphical data stored at the buffer 82 pointed to by this entry 91. Once the graphical data is retrieved, the network protocol layer 254 converts the data into a form that is suitable for communication over network 22 according to the appropriate protocol.

For example, in an exemplary embodiment, the system 20 preferably enables graphical data from any of the graphics applications 25 to be selectively communicated over the network via either TCP or UDPM. If TCP is selected, the network protocol layer 254 packetizes the graphical data according to TCP standards, and the network socket 269 then provides the packetized data to a network interface 101 (FIG. 2), which interfaces the packetized data with the network 22. The network 22 then transmits each packet to its appropriate receiving unit 24 using known or future-developed networking techniques. Note that, in such an example, the network protocol layer 254, in accordance with conventional TCP standards and techniques, preferably handles various handshaking and other tasks to ensure that each transmitted packet successfully arrives at its destination.

If UDPM protocol is selected instead, then the network protocol layer 254, in accordance with UDPM standards, packetizes the graphical data retrieved by the session logic 49. The network socket 269 then provides the packetized data to a network interface 101 (FIG. 2), which interfaces the packetized data with the network 22, and the network 22 then transmits each packet to is appropriate receiving unit 24.

According to UDPM protocol, each packet is not guaranteed to successfully arrive at its destination. Thus, it may be desirable for the session logic 49 of the transmitting session 39 to perform various handshaking with each destination receiving unit 24 to verify whether the receiving unit 24 has successfully received the transmitted data. In such an embodiment, the session logic 49 may be configured to save a copy of each transmitted packet until the logic 49 verifies that the packet has been successfully received by each receiving unit 24 that is to receive the packet. If the session logic 49 discovers that a receiving unit 24 failed to receive a particular data packet, then the session logic 49 may initiate a transmission of a copy of the lost data packet. Note that various network protocols in addition to or in lieu of TCP and UDPM may be employed to communicate, over the network 22, the graphical data retrieved by the session logic 49.

As shown by FIG. 10, each rendering session 92 preferably comprises session logic 103 and an OGL daemon 284 running on an OS thread 287. The session logic 103 is configured to retrieve graphical data from the shared resource 45 in accordance with the techniques previously described hereinabove. In this regard, the session logic 103 searches the queue 52 for an entry 91 having a session identifier 94 that identifies the rendering session 92 and retrieves the graphical data stored at the buffer 82 pointed to by this entry 91. Once the graphical data is retrieved, the OGL daemon 284 is configured to accelerate or drive the graphical data through a graphics accelerator 105 (FIG. 2), sometimes referred to as a "graphics adapter," such that the graphical data is rendered to the display device 97 (FIG. 2).

Figure 11:
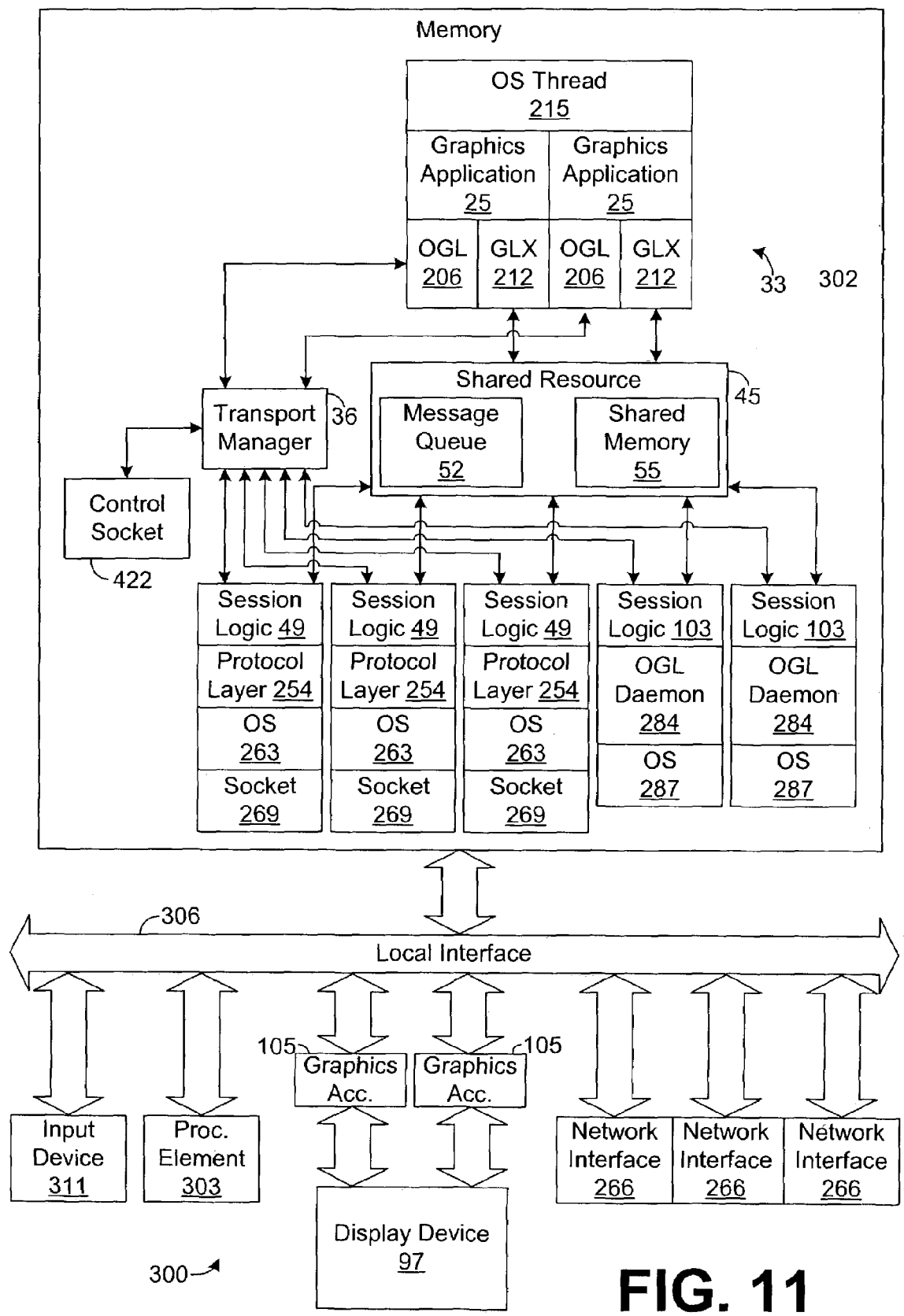
FIG. 11 is a block diagram illustrating an exemplary computer system for implementing a transmitting unit, such as is depicted in FIG. 2.

The graphics applications 25, buffer logic 33, transport manager 36, shared resource 45, and sessions 39 and 92 are preferably implemented via a computer system 300 shown by FIG. 11. In addition to the foregoing components, the computer system 300 preferably comprises at least one conventional processing element 303, such as a digital signal processor (DSP) or a central processing unit (CPU), that communicates to and drives the other components of the system 300 via a local interface 306, which can include one or more buses. Furthermore, an input device 311, for example, a keyboard or a mouse, can be used to input data from a user of the system 300, and the display device 97, or some other output device, can be used to output data to the user. The general operation of the computer system 300 will be described in more detail hereinbelow. Note that the graphics applications 25, transport manager 35, and sessions 39 and 92 may be implemented in software and stored in memory 302, as depicted by FIG. 11.

Figure 12:
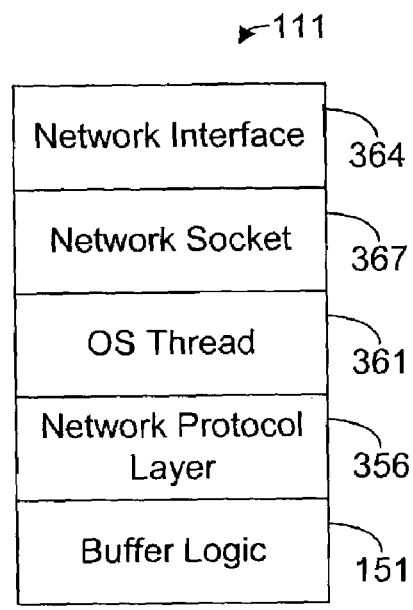
FIG. 12 is a block diagram illustrating an exemplary receiver, such as is depicted in FIG. 5.

As shown by FIG. 12, each receiver 111 (FIG. 5) preferably comprises buffer logic 151 and a network protocol layer 356 running on an OS thread 361. Each receiver 111 also comprises a network interface 364 and a network socket 367. When a data packet from the network 22 is received by the network interface 364, the network socket 367 provides the data packet to the network protocol layer 356. The network protocol layer 356 then recovers the graphical data and application identifier of the data packet, and the buffer logic 151 stores the recovered data in the shared resource 121 (FIG. 5), according to the techniques previously described hereinabove. Thus, the buffer logic 151 pops an empty buffer entry 142 from the queue 125 and stores the recovered graphical data in a buffer 134 identified by the pointer 144 (FIG. 6) of the popped entry 142. The buffer logic 151 then pushes, into the queue 125, at least one entry 142 pointing to the foregoing buffer 134 and having an application identifier 146 that identifies the graphics application 25 (FIG. 2) that originally produced the graphical data.

Figure 13:
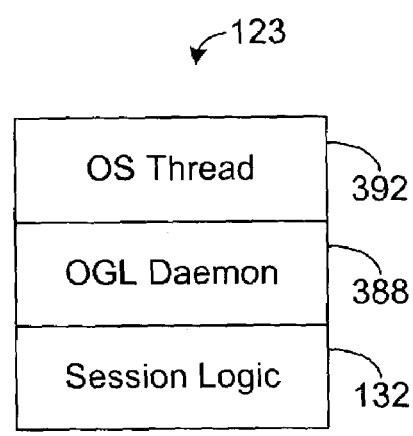
FIG. 13 is a block diagram illustrating an exemplary rendering session, such as is depicted in FIG. 5.

As shown by FIG. 13, each rendering session 123 (FIG. 5) preferably comprises an OGL daemon 388 running on an OS thread 392 that is preferably separate from the OS thread 361 of FIG. 12. The session logic 132 of the rendering session 123 depicted by FIG. 13 preferably runs on the OS thread 392 and, according to the techniques described above, searches the queue 125 for entries 142 having a particular application identifier 146 (i.e., an application identifier identifying the graphics application 25 that produces graphical data to be rendered by the session 123). When such an entry 142 is found, the session logic 132 pops the entry 142 from the queue 125 and then retrieves the graphical data stored in the buffer 134 pointed to by the popped entry 142. The OGL daemon 392, via known or future-developed techniques, then drives the retrieved data through a graphics accelerator 137 (FIG. 5) thereby rendering the graphical data.

Note that when the foregoing graphical data has been retrieved by the session logic 132, the session logic 132 preferably decrements the consumer count 162 of the read buffer 134. If the session logic 132 decrements the consumer count 162 to zero, the logic 132 pushes, into the queue 125, an empty buffer entry 142 that points to the buffer 134 from where the graphical data was previously retrieved. Thus, this buffer 134 is effectively freed for use by any of the receivers 111 to write newly received graphical data.

Figure 14:
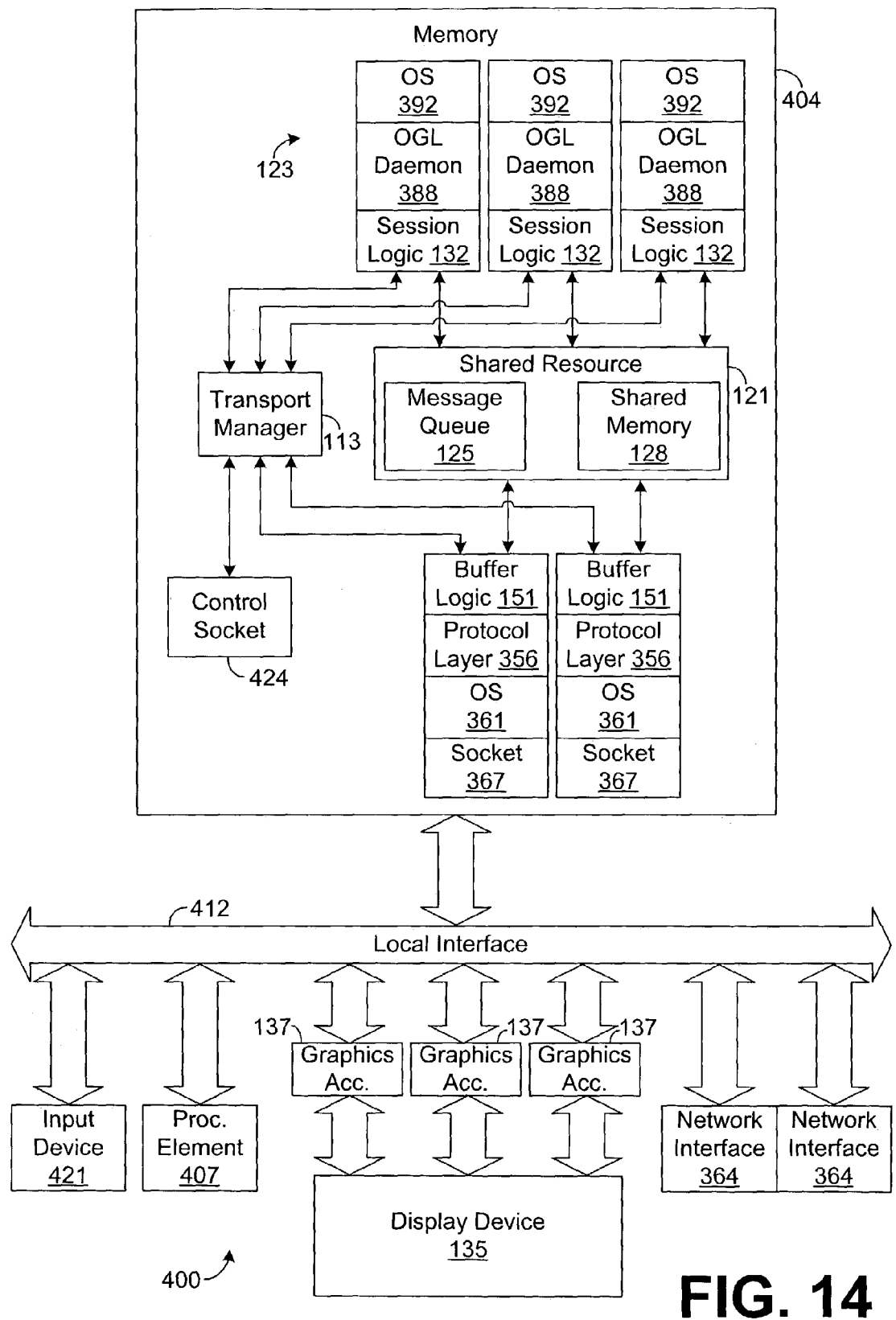
FIG. 14 is a block diagram illustrating an exemplary computer system for implementing a receiving unit, such as is depicted in FIG. 5.

FIG. 14 depicts a computer system 400 that may be used to implement at least one receiving unit 24 (FIG. 5). As shown by FIG. 14, the computer system 400 comprises the components of at least one receiver 111 depicted by FIG. 12 and the components of at least one rendering session 123 depicted by FIG. 13. As shown by FIG. 14, at least some of the components of the receiver 111 and rendering session 123 may be implemented in software and stored in memory 404. When implemented in software, such components may be stored on a computer-readable medium.

The computer system 400 of FIG. 14 preferably comprises at least one conventional processing element 407, such as a digital signal processor (DSP) or a central processing unit (CPU), that communicates to and drives the other components of the system 400 via a local interface 412, which can include one or more buses. Furthermore, an input device 421, for example, a keyboard or a mouse, can be used to input data from a user of the system 400, and the display device 135, or some other output device, can be used to output data to the user. The general operation of the computer system 400 will be described in more detail hereinbelow.

Note that when the transport manager 36 of FIG. 11, in response to a session request, as described above, initiates communication with the transport manager 113 of FIG. 14, the transport managers 36 and 113 establish a pair of control sockets 422 (FIG. 11) and 424 (FIG. 14) by which to communicate with each other. Based on information exchanged over these control sockets 422 and 424, the transport manager 36 may establish at least one socket 269, according to known or future-developed techniques, and then allocate this socket 269 to at least one of the communication sessions 39 (FIG. 9). Further, based on the exchanged information, the transport manager 113 may, similarly, establish at least one socket 367, according to known or future-developed techniques, and then allocate this socket 367 to at least one of the receivers 111 (FIG. 12).

In alternative embodiments, each graphics application 25 (FIG. 2) and receiver 111 may be configured to establish the sockets 269 and 367, respectively. However, in such embodiments, each such graphics application 25 would establish and maintain a control socket, and each such receiver 111 would also establish and maintain a control socket as well. Thus, several control sockets may be established and maintained at each of the transmitting and receiving units 21 and 24. However, in the exemplary embodiment described above where the transport managers 36 and 311 establish sockets, it is possible for the transport manager 36 to establish a relatively large number of sockets 269 for a relatively large number of communication sessions 36 using a small number (e.g., one) control socket 422 (FIG. 11). Further, in such exemplary embodiment, it is possible for the transport manager 113 to establish a relatively large number of sockets 367 for a relatively large number of receivers 111 using a small number (e.g., one) control socket 424. Thus, having the transport managers 36 and 113 establish and hand-off sockets 269 or 367 helps to reduce the number of sockets created and managed by the system 20.

In addition, according to the techniques described above, it is possible for the same communication session 39 to service multiple graphics applications 25. As a result, data produced by multiple graphics applications 25 can be communicated through the same socket 269 enabling the system 20 to employ a lower number of sockets 269 than would otherwise be possible if each graphics application 25 established and maintained a separate socket 269 for communicating its data to the network 22.

Furthermore, having the transport manager 36 establish and hand-off sockets 269 to communication sessions 39 helps to simplify the configuration of the graphics applications 25 since the graphics applications 25 do not need to include complex logic for establishing and managing such sockets 269. In addition, delegating the establishment and management of sockets 269 to the transport manager 36, as described above, reduces the processing burden put on the graphics applications 25 allowing these applications 25 to produce graphical data with fewer delays. Further, the configurations of the transport manager 36 and communication sessions 39 described above help make the transmitting unit 21 scalable for accommodating various numbers of graphics applications 25 and various types of communication environments.

A preferred use and operation of the communication system 20 and associated methodology are described hereafter.

For the purposes of illustration, assume that it is desirable for one of the graphics applications 25, when running on the computer system 300 of FIG. 11, to produce data that is to be rendered by rendering sessions 123 (FIG. 5) at multiple receiving units 24 (FIG. 2). The foregoing graphics application 25 will be referred to hereafter as the "transmitting application 25," and the foregoing receiving units 24 will be referred to hereafter as the "destination receiving units 24."

When the transmitting application 25 is invoked, it submits a request for establishing a network connection or socket. The OGL layer 206 (FIG. 11) is preferably aware of the destination receiving units 24 as well as which type of protocol is to be used to communicate the graphical data of the transmitting application 25 to the destination receiving units 24. For illustrative purposes, assume that UDPM is to be utilized to communicate such graphical data to the destination receiving units 24.

Figure 15:
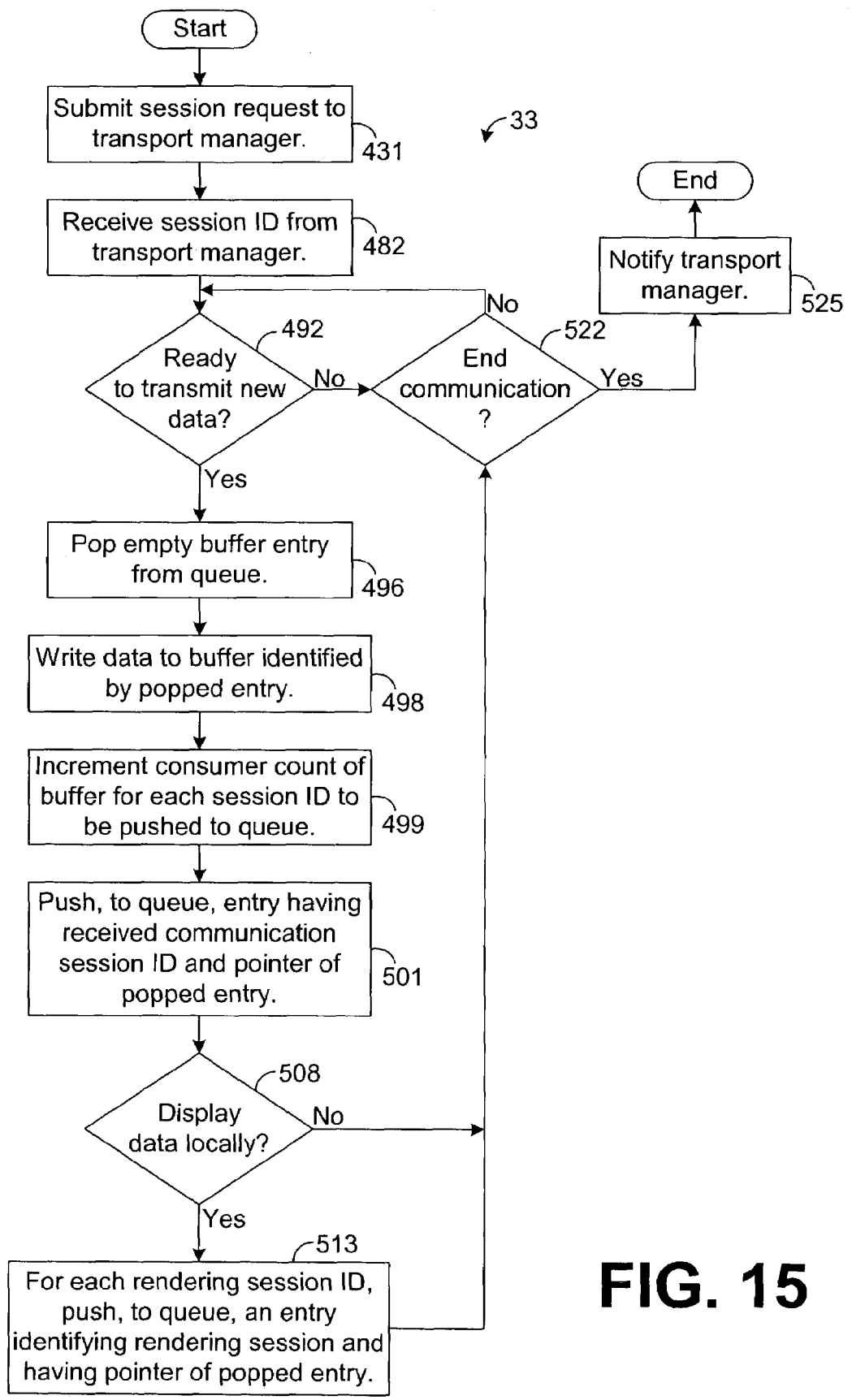
FIG. 15 is a flow chart illustrating an exemplary architecture and functionality of a set of buffer logic, such as is depicted in FIG. 2.

In response to the foregoing request, the OGL layer 206 associated with the transmitting application 25 submits a session request to the transport manager 36, as shown by block 431 of FIG. 15. This session request preferably comprises the IP address of each destination receiving unit 24 as well as data indicating that UDPM is to be employed to communicate with the receiving units 24. As shown by decision block 452 and block 455 of FIG. 16, the transport manager 36 selects a set of communication sessions 39 to service the transmitting application 25 (i.e., the application 25 that initiated the session request).

Figure 17:
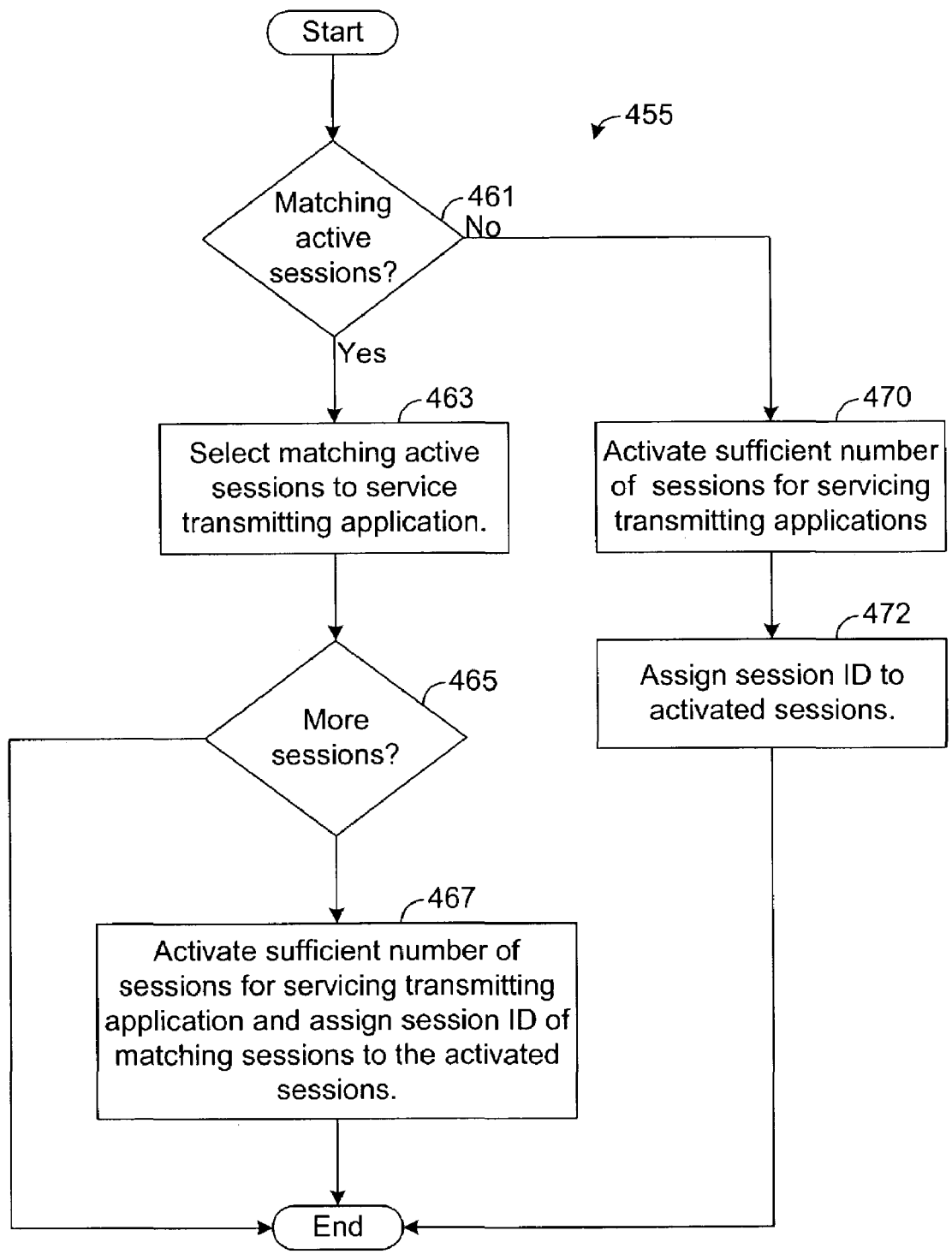
FIG. 17 is a flow chart illustrating an exemplary architecture and functionality of a transport manager, such as is depicted in FIG. 2, in selecting a set of communication sessions for servicing a graphics application.

In this regard, as shown by decision block 461 of FIG. 17, the transport manager 36 determines whether there exists any active communication sessions 39 that are currently communicating with the same destination receiving units 24 via the same protocol (i.e., UDPM in the instant example) identified by the session request. If the transport manager 36 identifies such matching communication sessions 39, the transport manager 36 may select such identified sessions 39 for servicing the transmitting application 25, as shown by block 463. However, if there are an insufficient number of matching communication sessions 39 to adequately service the transmitting application 25, then the manager 36 preferably selects at least one inactive session 39 for servicing the transmitting application 25, as shown by decision block 465 and block 467, and the transport manager 36 then activates each selected inactive session 39. In activating such sessions 39, the manager 36 provides each such activated session 39 with the IP addresses of the destination receiving units 24 and assigns the activated session 39 the session identifier 94 of the communication sessions 39 selected in block 455.

If there are no active sessions 39 presently communicating with the same destination receiving units 24 via the same protocol identified by the session request, then the transport manager 36 selects and activates a suitable number of inactive communication sessions 39 for servicing the transmitting application 25, as shown by blocks 461 and 470. In activating such sessions 39, the manager 36 provides each such activated session 39 with the IP addresses of the destination receiving units 24 and assigns the activated session 39 a unique session identifier 94 that has not been assigned to the other active sessions 39, as shown by block 472

Figure 16:
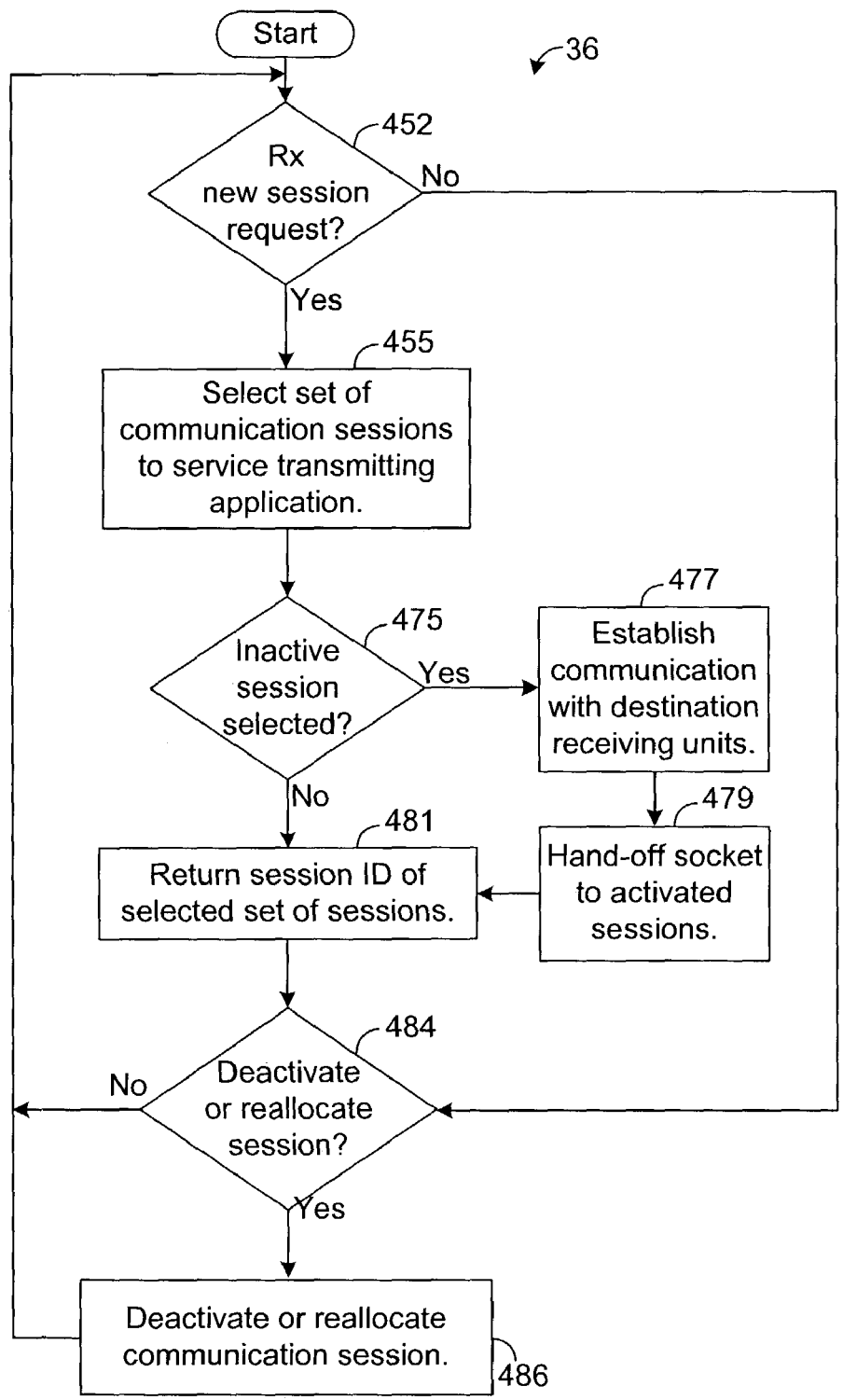
FIG. 16 is a flow chart illustrating an exemplary architecture and functionality of a transport manager, such as is depicted in FIG. 2.

If there were any sessions activated via either blocks 467 or 470, the transport manager 36 establishes communication with the transport managers 113 of the destination receiving units 24, as shown by decision block 475 and block 477 of FIG. 16. In particular, the transport manager 39 establishes at least one control socket 422 for communicating with such units 24. The transport manager 36 also establishes, for each of the sessions 39 activated in block 467 or 470, a socket 269 configured to communicate with each of the destination receiving units 24 via UDPM. Then, the transport manager 36 hands-off or, in other words, allocates each such socket 269 to one of the activated sessions 39, as shown by block 479.

As shown by block 481, after selecting a set of sessions 39 for servicing the transmitting application 25, the transport manager 36 provides the aforementioned OGL layer 206 with the session identifier that identifies the selected set of sessions 39, which will be referred to hereafter as the "servicing sessions 39." Note that this session identifier is received by the OGL layer 206 in block 482 of FIG. 15. In decision block 484 of FIG. 16, the transport manager 36 determines whether it has received any unserviced termination notifications from any of the sets of buffer logic 33 of FIG. 2.

Such termination notifications indicate that one of the graphics applications 25 will no longer be producing graphical data for transmission over the network 22. Further, such a termination notification preferably comprises the session identifier 94 of the set of sessions 39 that is servicing the terminating graphics application 25. Thus, in response to a termination notification, the transport manager 36 preferably determines whether the communication sessions 39 identified by the session identifier of the notice are servicing another application 25. If not, the transport manager 36 may deactivate or reallocate to another graphics application 25, any of the identified sessions 39, as shown by block 486. However, if the identified sessions 39 are servicing another application 25, then the transport manager 36 preferably skips blocks 486.

Note that in block 484, the transport manager 36 may also determine whether a communication element, such as a graphics application 25 or receiving unit 24, has stopped running or communicating with a communication session 39 even though a termination notice is not received from the communication element. In this regard, in some circumstances usually due to an error or an unexpected event, a communication element, such as a graphics application 25 or a receiving unit 24, may cease operation and, therefore, cease communicating with a communication session 39 without having the opportunity to gracefully terminate its operation. Thus, the communication element may terminate before having a chance to submit a termination notification to the transport manager 36. The transport manager 36 may be configured to monitor the communication of the sessions 39 to determine when communication between a communication session 39 and a communication element, such as a graphics application 25 or a receiving unit 24, has ceased. In such a situation, it may be desirable to terminate or reallocate the communication session 39, if the communication session 39 is not presently communicating graphical data successfully from at least one graphics application 25 to at least one receiving unit 24.

For example, the transport manager 36 may monitor the graphics applications 25 and determine that one of the graphics applications 25 is no longer producing graphical data. If the communication session 39 servicing the foregoing graphics application 25 is not servicing another application 25, then the transport manager 36 may deactivate the communication session 39 in order to conserve the processing resources of the transmitting unit 21. Alternatively, the transport manager 36 may reallocate the communication session 39 such that the session 39 services another graphics application 25.

In another example, the transport manager 36 may determine that the data being transmitted by a communication session 39 is not being successfully received by any of the receiving units 24. Such a condition may arise due to a network error or due to one or more receiving units 24 ceasing communication with the session 39 without providing notice to the transmitting unit 21 and, more particularly, to the transport manager 36. In such an example, the transport manager 36 may deactivate or reallocate the communication session 39. The transport manager 36 may further notify the graphics application 25 being serviced by the foregoing session 39 such that the graphics application 25 may quit its operation or attempt to re-establish communication with the receiving units 24.

Various other techniques for managing the communication sessions 39 by monitoring communication between the communication sessions 39 and other components of the system 20 are possible in other embodiments. Indeed, co-pending and commonly-assigned U.S. patent application entitled "Apparatus and Method for communicating with a Network and for Monitoring Operational Performance of the Apparatus," and filed on Feb. 8, 2003, which is incorporated herein by reference describes various techniques for monitoring the operation of the system 20 and controlling the resources of the system 20 based on such monitoring.

Once the OGL layer 206 receives the aforementioned session identifier from the transport manager 36, graphical data produced by the transmitting application 25 may be stored in the shared resource 45. When the transmitting application 25 produces a set of graphical data (e.g., a graphics command), the OGL layer 206 and/or GLX layer 212 convert the graphical data into a form consistent with OGL standards, and the GLX layer 212 then pops an empty buffer entry 91 from the queue 52, as shown by decision block 492 and block 496 of FIG. 15.

In this regard, the GLX layer 212 searches the queue 52 until it finds an entry 91 that has the empty buffer value stored as its session identifier 94 (FIG. 4). When the GLX layer 212 finds such an entry 91, the GLX layer 212 pulls the entry 91 from the queue 52 and then stores the set of graphical data in the buffer 82 identified by the popped entry's pointer 96 (FIG. 4), as shown by block 498 of FIG. 15. In writing the graphical data to the buffer 82, the GLX layer 212 stores, in the header 85 of the buffer 82, an application identifier 146 (FIG. 3) identifying the application 25 that generated the data (i.e., the transmitting application 25). Also, as shown by block 499, the GLX layer 212 increments the consumer count 99 of this header 85 for each session 39 and 92 that is to read such data. Thus, if the data is not to be rendered locally, then the GLX layer 212 increments the consumer count 99 to a value of one (1). However, if the data is to be rendered locally, then the GLX layer 212 further increments the consumer count 99 once for each rendering session 92 that is to read the data.

Note that at any given instant, no more than one empty buffer entry 91 points to the same buffer 82. Thus, by popping an empty buffer entry 91 in block 496, the GLX layer 212 effectively prevents or disables other components from writing to the buffer 82 identified by the popped entry 91. Therefore, the GLX layer 212 may write a set of graphical data into this buffer 82 in block 498 without risking corruption of the data by another set of buffer logic 33. In this regard, as described hereafter, another empty buffer entry 91 identifying the foregoing buffer 82 is not pushed into the queue 25 until at least the set of graphical data produced by the transmitting application 25 is read out of the foregoing buffer 82 for the purposes of transmitting the set of graphical data to the receiving units 24. Thus, until such an entry 91 is pushed into the queue 52, none of empty buffer entries 91 residing in the queue 52 identify the buffer 82 that is storing the set of graphical data. As a result, other components are effectively prevented from overwriting the set of graphical data until it has been retrieved from the buffer 82.

As shown by block 501 of FIG. 15, once the aforementioned set of graphical data is written to the identified buffer 82, the GLX layer 212 pushes, to the queue 52, an entry 91 having (1) a pointer 96 (FIG. 4) that points to the foregoing buffer 82 and (2) a session identifier 94 that identifies the servicing sessions 39 (i.e., the set of sessions 39 previously selected by the transport manager 36 in block 455 of FIG. 16 to service the transmitting application 25). Further, assume that, in the present example, the aforementioned set of graphical data produced by the transmitting application 25 is to be rendered locally via the computer system 300. In such an embodiment, the GLX layer 212 pushes, to the queue 52, an additional entry 91 for each rendering session 92 that is to read the foregoing buffer 82, as shown by decision block 508 and block 513 of FIG. 15. Each such additional entry 91 also has a pointer 96 pointing to the aforementioned buffer 82 where the set of graphical data is stored. The session identifier 94 (FIG. 4) of each additional entry 91 preferably identifies a different rendering session 92 (FIG. 2).

At this point, the transmitting application 25 and its corresponding buffer logic 33 have completed their processing of the set of graphical data and may initiate a new task (e.g., produce another set of graphical data). However, if the present operation of the transmitting application 25 is quit such that no new task is to be performed until the application 25 is later invoked again, the OGL layer 206 transmits a termination notification to the transport manager 36, as shown by decision block 522 and block 525. In response, the transport manager 36 determines whether the servicing sessions 39 are presently servicing another graphics application 25. If not, the transport manager 36 deactivates the servicing sessions 39 in response to the termination notice. As a result, the servicing sessions 39 do not further usurp significant processing resources of the computer system 300. However, if the servicing sessions 39 are presently servicing another graphics application 25, then the transport manager 36 enables the servicing sessions 39 to remain active.

Figure 18:
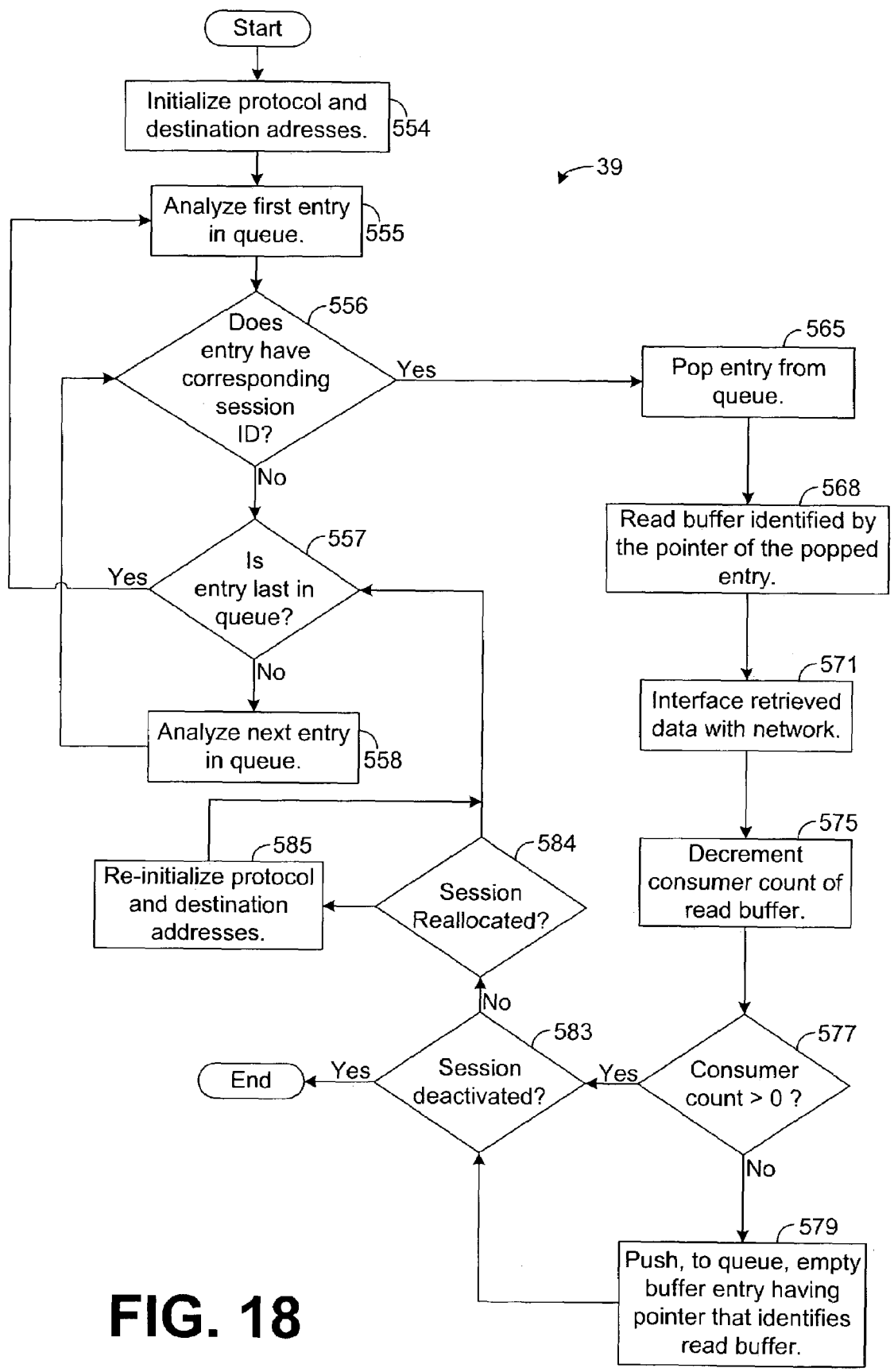
FIG. 18 is a flow chart illustrating an exemplary architecture and functionality a communication session, such as is depicted in FIG. 2.

Once activated by the transport manager 36, the session logic 49 of each servicing session 39 initializes a protocol and a set of destination addresses based on information provided by the transport manager 36, as shown by block 554 of FIG. 18. Continuing with the instant example, the session logic 49 is configured to communicate via UDPM to the destination receiving units 24 via a UDPM socket 269 established by the transport manager 36. As shown by blocks 555-558 of FIG. 18, the session logic 49 begins to search the queue 52 for entries 91 having a session identifier 94 identifying the servicing sessions 39. At some point, the session logic 49 analyzes the first entry 91 pushed to the queue 52 by the GLX layer 212 in block 501 of FIG. 15. Since this entry 91 has a session identifier that identifies the servicing sessions 39, the session logic 49 of one of the servicing sessions 39 pops this entry 91 from the queue 52 in block 565 of FIG. 18. The session logic 49 then retrieves the aforementioned set of graphical data from the buffer 82 identified by the popped entry 91, as shown by block 568 of FIG. 18.

The network layer 254 (FIG. 11) then packetizes the retrieved data for transmission across the network 22 (FIG. 2) according to UDPM standards. In particular, the network layer 254 packetizes the set of graphical data and writes, in block 571 of FIG. 18, the packetized data to the UDPM socket 269 provided by the transport manager 36 such that the set of graphical data is transmitted over the network 22 to each destination receiving unit 24. Note that the network layer 254 preferably inserts, in each packet, the application identifier 146 (FIG. 3) stored in the header 85 of the buffer 82 in which the aforementioned set of graphical is stored. In other words, the network layer 254 inserts, in each packet, an application identifier 146 that identifies the transmitting application 25.

In addition, once the set of graphical data has been retrieved from the aforementioned buffer 82 in block 568, as described above, the session logic 49 decrements the consumer count 99 (FIG. 3) stored in the header 85 of the buffer 82 from where the set of graphical data is retrieved, as shown by block 575 of FIG. 18. If the value of the consumer count 99 is zero after being decremented, then there are no more entries 91 in the queue 52 that identify the foregoing buffer 82, and the data stored in the buffer 82 may be overwritten.

In such an example, the session logic 49 frees the buffer 82 by pushing, into the queue 25, an empty buffer entry 91 that points to the foregoing buffer 82, as shown by decision block 577 and block 579. However, in the instant example, there is another entry 91 (i.e., an entry 91 pushed to the queue 52 via block 513 of FIG. 15) in the queue 52 that identifies the buffer 82. Thus, assuming that this entry 91 has yet to be popped from the queue 52 by the rendering session 92 (FIG. 2), as will be described in more detail hereinbelow, it is desirable to continue preventing any of the components of system 300 (FIG. 11) from writing to the buffer 82. To achieve this effect, the session logic 49 skips block 579, in the present example, and proceeds to decision block 583 of FIG. 18. Moreover, after performing block 577 and, if appropriate, block 579, the session logic 49 repeats the process depicted by FIG. 18 unless the logic's session 39 is deactivated or reallocated by the transport manager via block 486 of FIG. 16. If reallocated, the session logic 49 re-initializes to a new protocol and/or set of destination addresses, as shown by decision block 584 and block 585. Note that the transport manager 36 may provide a new socket 269 according to a different protocol (e.g., TCP) if the session 39 is reallocated to another graphics application 25.

In addition, the session logic 103 (FIG. 10) of the rendering session 92 (FIG. 2) performs a process similar to the one depicted by FIG. 18. In this regard, the session logic 103 of the rendering session 92 searches the queue 52 for entries 91 having session identifiers 94 that identify the rendering session 92. At some point, the session logic 103 finds an entry 91 pushed, via block 513 of FIG. 15, into the queue 52 by the GLX layer 212 associated with the transmitting application 25. When this occurs, the session logic 103 pops this entry 91 from the queue 52. The session logic 103 then reads the set of graphical data from the buffer 82 identified by this entry 91 or, in other words, the buffer 82 previously read by the session logic 49 of one of the servicing session 39 described above. The OGL daemon 284 (FIG. 10) of the rendering session 92 drives this graphical data through a graphics accelerator 105 (FIG. 2), thereby rendering the data to the display device 97.

After reading the set of graphical data from the buffer 82, the session logic 103 of the rendering session 92 decrements the consumer count 99 (FIG. 3) stored in the header 85 of the buffer 82. Assuming that the session logic 103 of the servicing session 39 previously decremented the consumer count 99 via block 575 of FIG. 18 such that the consumer count 99 is now decremented to a value of zero (0), the session logic 103 preferably pushes, into the queue 52, an empty buffer entry 91 pointing to the buffer 82. As a result, the buffer 82 may be written to with data from any of the graphics applications 25.

At some point, the aforementioned set of graphical data transmitted by one of the servicing sessions 39 arrives at the network interface 364 (FIG. 12) of a receiver 111 (FIG. 5) in each of the destination receiving units 24. When the graphical data arrives at such a receiver 111, the buffer logic 151 (FIG. 5) of the receiver 111 pops an empty buffer entry 142 from the queue 125, as shown by decision block 632 and block 634 of FIG. 19. The buffer logic 151 then writes the set of graphical data to the buffer 134 identified by the pointer 144 of the popped entry 142, as shown by block 637 of FIG. 19. As shown by block 638, the buffer logic 151 also increments the consumer count 162 of the foregoing buffer 134 once for each session 123 that is to consume the buffer's data. Note that in the embodiment described herein, the number of sessions 123 to consume the buffer's data is indicated by a session count provided by the transport manager 113. Also note that popping the empty buffer entry 142 from the queue 125 in block 634 effectively prevents this data from being overwritten until an empty buffer entry 142 identifying the foregoing buffer 134 is later pushed to the queue 125.

Figure 19:
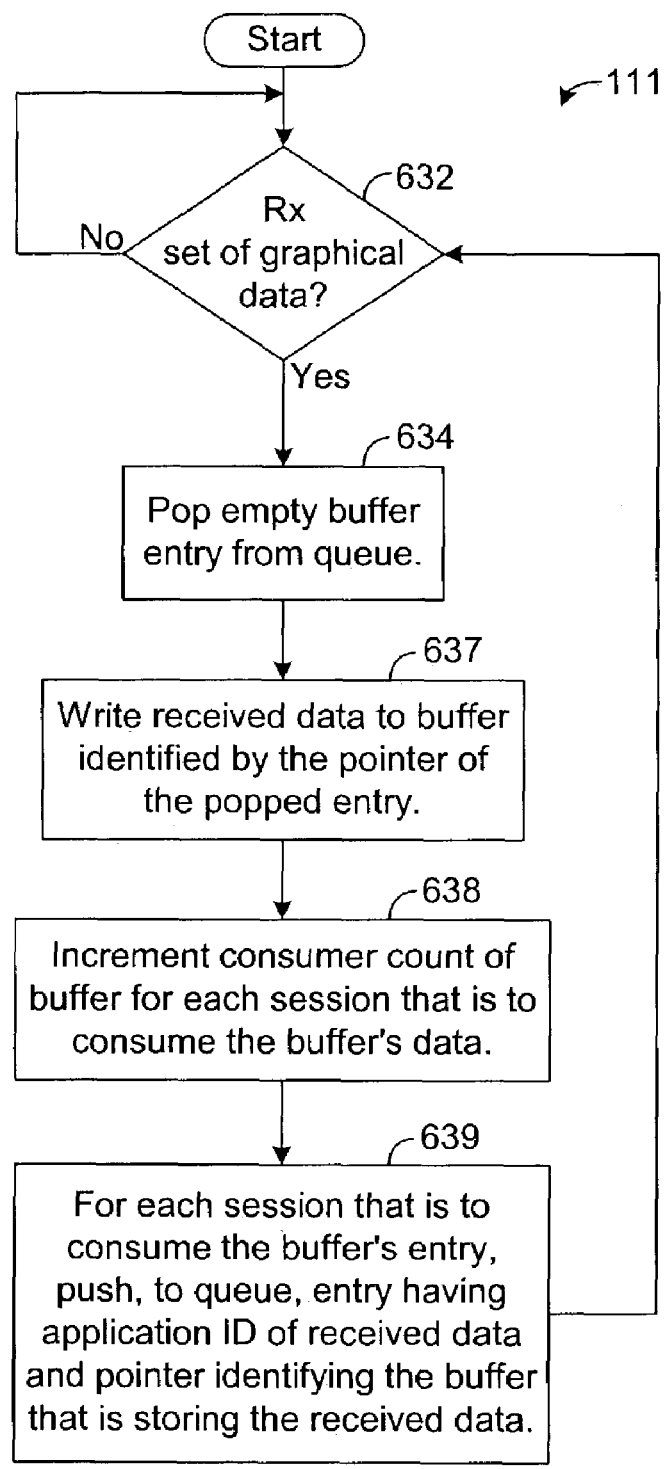
FIG. 19 is a flow chart illustrating an exemplary architecture and functionality of a receiver, such as is depicted in FIG. 5.

As shown by block 639 of FIG. 19, after writing the set of graphical data to the foregoing buffer 134, the buffer logic 151 pushes, into the queue 125, an entry 142 having (1) an application identifier 146 (FIG. 6) that matches the application identifier received with the set of graphical data and (2) a pointer 144 that points to the foregoing buffer 134. In other words, the buffer logic 151 pushes, into the queue 125, an entry 142 having an application identifier 146 that identifies the transmitting application 25 and a pointer 144 that points to the buffer 134 where the set of graphical data produced by such application 25 is written. Note that the buffer logic 151 pushes such an entry 142 for each session 123 that is to consume the buffer's data. As set forth above, the number of sessions 123 to consume the buffer's data is indicated by the session count provided from the transport manager 113.

Figure 20:
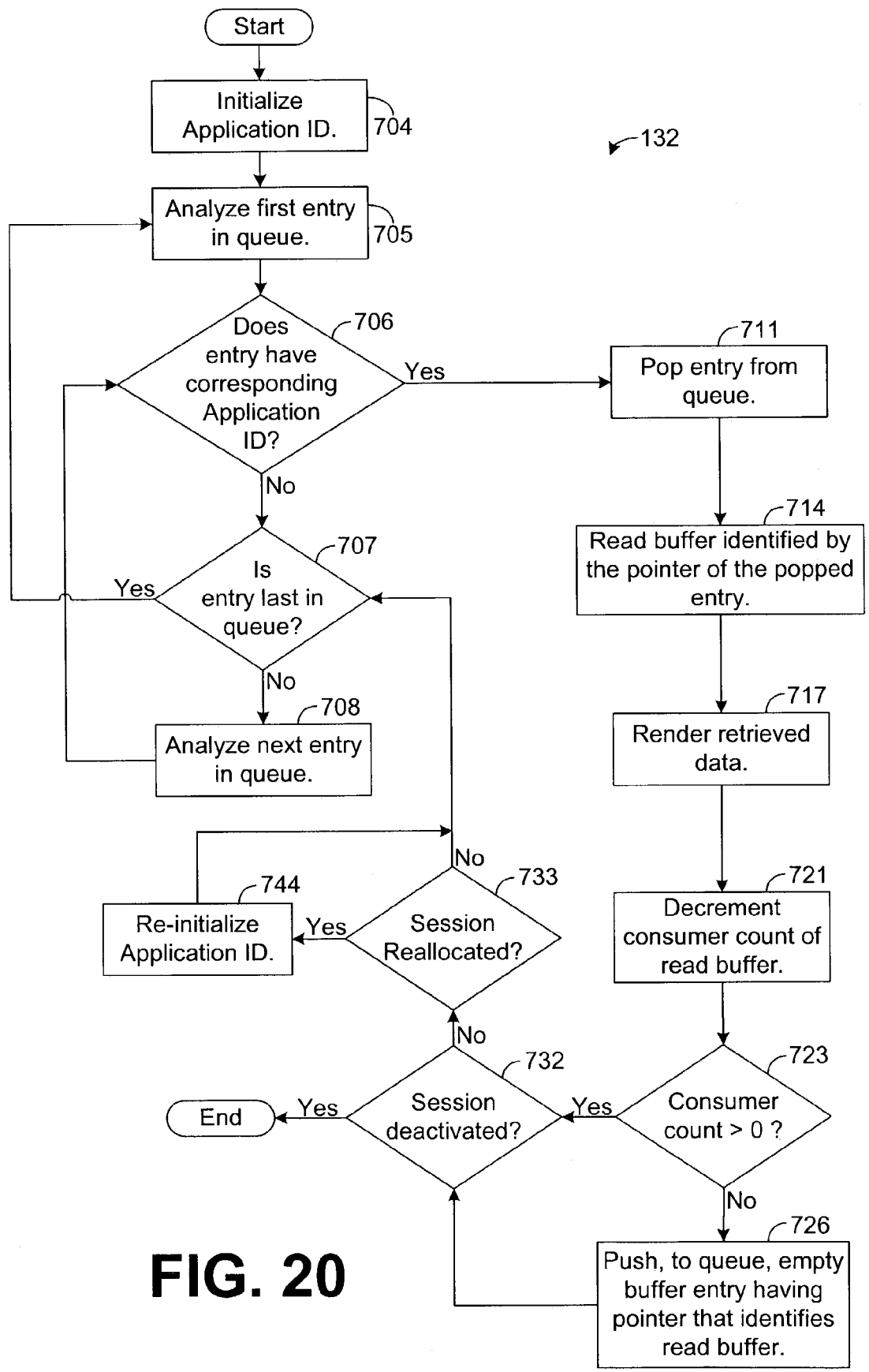
FIG. 20 is a flow chart illustrating an exemplary architecture and functionality of buffer logic, such as is depicted in FIG. 5.

The session logic 132 (FIG. 13) associated with at least one rendering session 123 in the same receiving unit 24 as the foregoing receiver 111 is preferably initialized to the application identifier of the transmitting application 25 via block 704 of FIG. 20. The session logic 132 of each such rendering session 123 searches the queue 125 for entries 142 having application identifiers 146 that identify the transmitting application 25, as shown by blocks 705-708 of FIG. 20.

At some point, the session logic 132 finds one of the aforementioned entries 142 pushed to the queue 125 in block 639 of FIG. 19. When this occurs, the session logic 132 pops this entry 142 from the queue 125 and reads the buffer 134 pointed to by this entry 142, as shown by blocks 711 and 714. In other words, the session logic 132 reads, from the shared memory 128, the set of graphical data transmitted from the transmitting application 25. The OGL daemon 388 (FIG. 13) then drives the retrieved graphical data through a graphics adapter 137 (FIG. 5), thereby rendering the graphical data, as shown by block 717. Note that such data may be rendered to the display device 135 of the computer system 400 depicted by FIG. 14.

After retrieving the set of graphical data, via block 714, from a buffer 134 of the shared memory 128, the session logic 132 preferably decrements the consumer count 162 of this buffer 134, as shown by block 721. If the consumer count 162 is decremented to zero (0) via implementation of block 721, the session logic 132 pushes, into the queue 125, an empty buffer entry 142 that points to the foregoing buffer 134, as shown by decision block 723 and block 726 of FIG. 20. Pushing such an entry 142 has the effect of freeing the buffer 134 or, in other words, allowing the receivers 111 to write to the buffer 142.

As shown by decision block 732, the process shown by FIG. 20 continues until the rendering session 123 is deactivated by the transport manager 113. If the transport manager 113 reallocates the rendering session 123 to servicing a new application 25, then the session logic 132 re-initializes its application identifier such that it searches for the application identifier of the new application 25 in the queue 125, as shown by decision block 733 and block 734. Note that it is possible for the session logic 132 to be simultaneously associated with a plurality of application identifiers such that logic 132 concurrently performs the process shown by FIG. 20 for multiple application identifiers.

Moreover, by performing the aforedescribed techniques, graphical data is efficiently and reliably transmitted from the transmitting application 25 to each of the receiving units 24. Further, even though the graphical data may be communicated to a relatively large number of receiving units 24, the transmitting application 25 is not significantly burdened with the task of interfacing the graphical data with the network 22.

The invention claimed is:

1. An apparatus for communicating data, comprising:
an application configured to initiate a session request specifying a set of receiving units and a transport protocol;
a plurality of communication sessions;
a transport manager configured to allocate at least one of the communication sessions to the application in response to the session request, the transport manager further configured to provide a session identifier that identifies the allocated session, wherein the transport manager configures, based on the session request, the allocated session to communicate with the specified set of receiving units via the specified protocol; and
buffer logic configured to store data produced by the application into a shared memory accessible to each of the communication sessions and to associate the stored data with the session identifier, wherein the allocated session is configured to retrieve the data based on the session identifier and to transmit the retrieved data through a network to the specified set of receiving units via the specified protocol.

2. The apparatus of claim 1, wherein the application is configured to run on a first thread of an operating system, and wherein the allocated session is configured to run on a second thread of the operating system.

3. The apparatus of claim 1, wherein the allocated session is configured to disable at least one other of the sessions from retrieving and transmitting, to the specified set of receiving units, the retrieved data.

4. The apparatus of claim 1, wherein the transport manager is configured to determine, in response to the session request, whether at least one of the communication sessions is presently configured to communicate with the specified set of receiving units via the specified protocol.

5. The apparatus of claim 1, wherein the buffer logic is configured to store, into a queue, an entry pointing to the data and to associate the entry with the session identifier.

6. A data communication system, comprising:
means for initiating a session request, the session request specifying a set of receiving units and a transport protocol, the session request associated with an application;
means for allocating at least one of a plurality of communication sessions to the application in response to the session request;
means for providing, in response to the session request, a session identifier that identifies the allocated session;
means for configuring the allocated session to communicate with the specified set of receiving units via the specified protocol;
means for associating data produced by the application with the session identifier;
means for locating, via the allocated session, the produced data based on the associated identifier; and
means for transmitting, via the allocated session, to the specified set of receiving units via the specified protocol.

7. A data communication method, comprising:
initiating a session request, the session request specifying a set of receiving units and a transport protocol, the session request associated with an application;
allocating at least one of a plurality of communication sessions to the application in response to the session request;
providing, in response to the session request, a session identifier that identifies the allocated session;
configuring the allocated session to communicate with the specified set of receiving units via the specified protocol;
associating data produced by the application with the session identifier;
locating, via the allocated session, the produced data based on the associated identifier; and
transmitting, via the allocated session, to the specified set of receiving units via the specified protocol.

8. The method of claim 7, further comprising:
running the application via a first thread of an operating system; and
running the allocated session via a second thread of an operating system.

9. The method of claim 7, further comprising determining, in response to the session request, whether at least one of the communication sessions is presently configured to communicate with the specified set of receiving units via the specified protocol.

* * * * *